United States Patent
Yoshimura et al.

(10) Patent No.: US 8,129,073 B2
(45) Date of Patent: Mar. 6, 2012

(54) CATALYST-COATED MEMBRANE, MEMBRANE-ELECTRODE ASSEMBLY, FUEL CELL AND FUEL CELL STACK

(75) Inventors: Mikiko Yoshimura, Osaka (JP); Yoshihiro Hori, Nara (JP); Takeou Okanishi, Osaka (JP); Masaki Yamauchi, Osaka (JP)

(73) Assignee: Panasonic Corporation, Osaka (JP)

( * ) Notice: Subject to any disclaimer, the term of this patent is extended or adjusted under 35 U.S.C. 154(b) by 945 days.

(21) Appl. No.: 12/095,087

(22) PCT Filed: Nov. 24, 2006

(86) PCT No.: PCT/JP2006/323477
§ 371 (c)(1),
(2), (4) Date: May 27, 2008

(87) PCT Pub. No.: WO2007/061069
PCT Pub. Date: May 31, 2007

(65) Prior Publication Data
US 2010/0015487 A1    Jan. 21, 2010

(30) Foreign Application Priority Data
Nov. 25, 2005   (JP) ................................. 2005-340747

(51) Int. Cl.
*H01M 8/10*     (2006.01)
*H01M 4/36*     (2006.01)
*H01M 4/02*     (2006.01)
*H01M 4/62*     (2006.01)

(52) U.S. Cl. ........ 429/492; 429/482; 429/483; 429/484; 429/523; 429/532; 429/534

(58) Field of Classification Search ................ 429/482, 429/483, 484, 492, 523, 532, 534
See application file for complete search history.

(56) References Cited

U.S. PATENT DOCUMENTS

| 2003/0044672 | A1 | 3/2003 | Fukumoto et al. |
| 2004/0038808 | A1* | 2/2004 | Hampden-Smith et al. .. 502/180 |
| 2004/0086633 | A1 | 5/2004 | Lemmon et al. |
| 2005/0142397 | A1 | 6/2005 | Wakahoi et al. |
| 2005/0175880 | A1* | 8/2005 | Cho et al. ......................... 429/33 |

FOREIGN PATENT DOCUMENTS
CN    1505193    6/2004
(Continued)

OTHER PUBLICATIONS

Chinese Office Action, with English translation, issued in Chinese Patent Application No. 200680044134.7, mailed Sep. 4, 2009.

(Continued)

*Primary Examiner* — Eugenia Wang
(74) *Attorney, Agent, or Firm* — McDermott Will & Emery LLP

(57) ABSTRACT

A catalyst-coated membrane that includes an anode catalyst layer, a cathode catalyst layer, and a hydrogen ion conductive polymer electrolyte membrane interposed between the anode catalyst layer and the cathode catalyst layer, a peripheral area of at least one of the anode catalyst layer and the cathode catalyst layer is provided with a decrease portion in which the mass of the electrode catalyst per unit area of the catalyst layer decreases from the inner side toward the outer side.

4 Claims, 14 Drawing Sheets

FOREIGN PATENT DOCUMENTS

| | | |
|---|---|---|
| EP | 1 229 600 A | 8/2002 |
| JP | 7-169471 | 7/1995 |
| JP | 7-201346 | 8/1995 |
| JP | 8-167416 | 6/1996 |
| JP | 2000-299119 | 10/2000 |
| JP | 2005-79057 | 3/2005 |
| JP | 2005-243622 | 9/2005 |

OTHER PUBLICATIONS

European Search Report issued in European Patent Application No. EP 06 83 3281.6 dated Nov. 13, 2009.

* cited by examiner

Inner Side    Outer Side

P        Q

Inner Side          Outer Side

CATALYST-COATED MEMBRANE, MEMBRANE-ELECTRODE ASSEMBLY, FUEL CELL AND FUEL CELL STACK

RELATED APPLICATIONS

This application is the U.S. National Phase under 35 U.S.C. §371 of International Application No. PCT/JP2006/323477, filed on Nov. 24, 2006, which in turn claims the benefit of Japanese Application No. 2005-340747, filed on Nov. 25, 2005, the disclosures of which Applications are incorporated by reference herein.

TECHNICAL FIELD

The present invention relates to a catalyst-coated membrane, a membrane-electrode assembly, a fuel cell and a fuel cell stack.

BACKGROUND ART

Fuel cells (FCs) have high power generation efficiency and impose less burden on the environment, and thus they are expected to be widely used as a distributed energy system in the future. Particularly, polymer electrolyte fuel cells that use a cation (hydrogen ion) conductive polymer electrolyte are expected to be utilized in mobile units such as automobiles, distributed power generation systems, home cogeneration systems, and so on because they have high output density, can operate at low temperatures, and can be made smaller.

Polymer electrolyte fuel cells generate electricity and heat simultaneously by electrochemically reacting a fuel gas containing hydrogen and an oxidant gas containing oxygen such as air. FIG. 17 is a schematic cross-sectional view illustrating an example of the basic structure of a unit cell designed to be installed in a conventional polymer electrolyte fuel cell. FIG. 18 is a schematic cross-sectional view illustrating an example of the basic structure of a membrane-electrode assembly (MEA) designed to be installed in the unit cell 100 shown in FIG. 17. FIG. 19 is a schematic cross-sectional view illustrating an example of a catalyst-coated membrane (CCM) that constitutes the membrane-electrode assembly 101 shown in FIG. 18.

As shown in FIG. 19, in the catalyst-coated membrane 102, a catalyst layer 112 composed of a hydrogen ion conductive polymer electrolyte and a catalyst-carrying carbon obtained by causing a carbon powder to carry an electrode catalyst (e.g. platinum metal catalyst) is formed on each surface of a polymer electrolyte membrane 111 that selectively transports hydrogen ions. As the polymer electrolyte membrane 111, polymer electrolyte membranes made of perfluorocarbon sulfonic acid (e.g., Nafion (trade name) available from E.I. Du Pont de Nemours & Co. Inc., USA) are widely used.

As shown in FIG. 18, the membrane-electrode assembly 101 is formed by forming a gas diffusion layer 113 having gas permeability and electron conductivity using, for example, carbon paper treated for water repellency on the outer surfaces of the catalyst layers 112. The combination of a catalyst layer 112 and a gas diffusion layer 113 forms an electrode 114 (anode or cathode). As shown in FIG. 17, the unit cell 100 is formed of the membrane-electrode assembly 101, gaskets 115 and a pair of separators 116. The gaskets 115 are disposed on the outer periphery of the electrodes with the polymer electrolyte membrane interposed therebetween so as to prevent the supplied fuel gas and oxidant gas from leaking out and to prevent them from mixing with each other. The gaskets 115 are usually combined in advance with the electrodes and the polymer electrolyte membrane. The combination of the polymer electrolyte membrane 111, a pair of electrodes 114 (each including a catalyst layer 112 and a gas diffusion layer 113) and the gaskets 115 may also be called a "membrane-electrode assembly".

A pair of separators 116 for mechanically fixing the membrane-electrode assembly 101 are disposed on the outer surfaces of the membrane-electrode assembly 101. In a portion of the separator 116 that contacts the membrane-electrode assembly 101, a gas flow path 117 for supplying a reaction gas (a fuel gas or oxidant gas) to the electrode and removing a gas containing an electrode reaction product and unreacted reaction gas from the reaction site to the outside of the electrode is formed. The gas flow path 117 can be formed independently of the separator 116, but is usually formed by providing a groove on a surface of the separator. On the other side of the separator 116 that is opposite from the membrane-electrode assembly 101, a cooling water flow path 118 is formed by providing a groove.

As described above, a single unit cell formed by fixing the membrane-electrode assembly 101 with a pair of separators 116 can produce an electromotive force of about 0.7 to 0.8 V at a practical current density of several tens to several hundreds mA/cm$^2$ by supplying a fuel gas to the gas flow path of one separator and an oxidant gas is supplied to the gas flow path of the other separator. However, polymer electrolyte fuel cells are usually required to produce a voltage of several to several hundreds volts when used as a power source. For this reason, the required number of unit cells are connected in series to form a stack capable of providing the required voltage for practical use.

In order to supply reaction gases to the gas flow paths 117, there is required a manifold in which a pipe for supplying a reaction gas is branched into a number corresponding to the number of separators and the branched ends are directly connected to the gas flow paths on the separators. Particularly, a manifold in which an external pipe for supplying a reaction gas is directly connected to the separators is called an "external manifold". There is another type of manifold called an "internal manifold", which has a simpler structure. An internal manifold is composed of apertures provided in the separators in which a gas flow path is formed. The inlet and outlet are connected with the apertures. The reaction gas is supplied to the gas flow path directly from the aperture.

The gas diffusion layer 113 has the following three functions. The first function is to diffuse a reaction gas so as to supply the reaction gas uniformly from the gas flow path of the separator 116 that is located on the outer surface of the gas diffusion layer 113 to the electrode catalyst in the catalyst layer 112. The second function is to rapidly exhaust water produced by a reaction in the catalyst layer 112 to the gas flow path. The third function is to transfer electrons required for a reaction or produced electrons. Therefore, the gas diffusion layer 113 is required to have high reaction gas permeability, high water drainage capability and high electron conductivity.

Generally, in order to impart gas permeability to a gas diffusion layer 113, a porous conductive substrate that is produced using a carbon fine powder, pore-forming material, carbon paper, carbon cloth or the like is used. In order to impart water drainage capability, a water repellent polymer as typified by fluorocarbon resin or the like is dispersed in the gas diffusion layer 113. In order to impart electron conductivity, the gas diffusion layer 113 is formed using an electron conductive material such as carbon fiber, metal fiber or carbon fine powder. The surface of the gas diffusion layer 113 that contacts the catalyst layer 112 may be provided with a water repellent carbon layer made of a water repellent polymer and a carbon powder.

The catalyst layer 112 has the following four functions. The first function is to supply a reaction gas supplied from the gas diffusion layer 113 to the reaction site in the catalyst layer 112. The second function is to transfer hydrogen ions required for a reaction on the electrode catalyst or generated hydrogen ions. The third function is to transfer electrons required for the reaction or produced electrons. The fourth function is to accelerate the electrode reaction by its high catalytic performance and its large reaction area. Therefore, the catalyst layer 112 is required to have high reaction gas permeability, hydrogen ion conductivity, electron conductivity and catalytic performance.

Generally, in order to impart gas permeability to a catalyst layer 112, a catalyst layer having a porous structure and a gas channel is formed using a carbon fine powder or pore-forming material. Further, in order to impart hydrogen ion permeability, a hydrogen ion network is formed by dispersing a polymer electrolyte in the vicinity of the electrode catalyst of the catalyst layer 112. In order to impart electron conductivity, an electron channel is formed using, as a carrier for carrying the electrode catalyst, an electron conductive material such as a carbon fine powder or carbon fiber. In order to improve catalytic performance, a catalyst element composed of a very fine particulate electrode catalyst with a particle size of several nm that is carried on a carbon fine powder is dispersed at a high density in the catalyst layer 112.

For the commercialization of polymer electrolyte fuel cells, various attempts have been made to improve the performance of catalyst layer 112. For example, to increase the utilization rate of catalyst in the catalyst layer, Patent Document 1 has proposed to adjust the catalyst distribution ratio between the cathode and the anode according to the gas concentration ratio of the anode and the cathode. Specifically, the catalyst distribution ratio of the cathode catalyst layer is increased in a region in which the gas concentration is higher at the cathode side than the anode side, whereas the catalyst distribution ratio of the anode catalyst layer is increased in a region in which the gas concentration is lower at the cathode side than the anode side. In other words, an electrode in which the catalyst distribution ratio is changed in the plane direction of a catalyst layer has been proposed.

A unit cell for a fuel cell, in which the composition of constituent materials is changed in the plane direction of a catalyst layer, has been disclosed in Patent Document 2. Specifically, a method has been proposed in which, in the cathode catalyst layer, the amount of catalyst is increased near the oxidant gas outlet than near the oxidant gas inlet, so as to prevent an excessive amount of produced water from staying in the cathode electrode.

Patent Document 1: Japanese Laid-Open Patent Publication No. Hei 7-169471

Patent Document 2: Japanese Laid-Open Patent Publication No. Hei 8-167416

DISCLOSURE OF THE INVENTION

Problem to be Solved by the Invention

However, the conventional techniques described above have been proposed to improve the initial cell characteristics of fuel cells and achieve efficient utilization of catalysts while reducing cost, and no conventional techniques have satisfactorily addressed a membrane-electrode assembly and a catalyst-coated membrane that can be used for a fuel cell specifically designed for long-term operation, and an improvement in fuel cell durability and life characteristics.

Specifically, both Patent Documents 1 and 2 do not report a catalyst-layer design technique with a view to enhance the durability of a membrane-electrode assembly and a catalyst-coated membrane. Thus, there still existed room for improvement in realizing a membrane-electrode assembly, a catalyst-coated membrane, a fuel cell and a fuel cell stack that have a long life and high efficiency.

The present invention has been conceived in light of the foregoing, and it is an object of the present invention to provide a fuel cell having excellent durability, in which the decomposition/degradation of a polymer electrolyte membrane can be suppressed and a decrease in initial characteristics can be prevented sufficiently for a long period of time even when the fuel cell is frequently started and stopped.

Another object of the present invention is to provide a catalyst-coated membrane and a membrane-electrode assembly that can readily and surely achieve a fuel cell having excellent durability, in which the decomposition/degradation of a polymer electrolyte membrane can be suppressed and a decrease in initial characteristics can be prevented sufficiently for a long period of time even when the fuel cell is frequently started and stopped.

Another object of the present invention is to provide a fuel cell stack that incorporates a plurality of the aforementioned fuel cells according to the present invention and has excellent durability, in which the decomposition/degradation of a polymer electrolyte membrane can be suppressed and a decrease in initial characteristics can be prevented sufficiently for a long period of time even when the fuel cell is frequently started and stopped.

Means for Solving the Problem

The present inventors conducted in-depth studies to achieve the above objects. They examined the possibility of significant influence of an anode catalyst layer and a cathode catalyst layer that are tightly attached to a polymer electrolyte membrane on the durability of the polymer electrolyte membrane, and found that the durability of a catalyst-coated membrane and the durability of a membrane-electrode assembly can be improved by forming a catalyst layer as described below. Based on this finding, the present invention has been accomplished.

Specifically, the present invention provides a fuel cell (unit cell) that includes at least: an anode catalyst layer; a cathode catalyst layer; a polymer electrolyte membrane that is interposed between the anode catalyst layer and the cathode catalyst layer; an anode gas diffusion layer that is disposed outside the anode catalyst layer in a laminated member (hereinafter referred to as "catalyst-coated membrane") comprising the anode catalyst layer, the polymer electrolyte membrane and the cathode catalyst layer; a cathode gas diffusion layer that is disposed outside the cathode catalyst layer in the catalyst-coated membrane; an anode-side separator that is disposed outside the anode gas diffusion layer in a laminated member (hereinafter referred to as membrane-electrode assembly) comprising the anode gas diffusion layer, the catalyst-coated membrane and the cathode gas diffusion layer, and that has a gas flow path for supplying a fuel gas to the anode gas diffusion layer and the anode catalyst layer formed therein; and a cathode-side separator that is disposed outside the cathode gas diffusion layer in the membrane-electrode assembly and that has a gas flow path for supplying an oxidant gas to the cathode gas diffusion layer and the cathode catalyst layer formed therein, wherein the anode catalyst layer and the cathode catalyst layer comprise a hydrogen ion conductive polymer electrolyte and a catalyst-carrying carbon that includes a carbon powder and an electrode catalyst carried on the carbon powder, and a peripheral area of a principal surface of at least one of the anode catalyst layer and the cathode catalyst layer is provided with a decrease portion in which the mass of the electrode catalyst per unit area of the catalyst layer decreases from the inner side toward the outer side.

In the fuel cell of the present invention, the peripheral area of the principal surface of at least one of the anode catalyst layer and the cathode catalyst layer is provided with a decrease portion in which the mass of catalyst per unit area of the catalyst layer decreases from the inner side toward the outer side.

By forming at least one of the anode catalyst layer and the cathode catalyst layer as described above, it is possible to easily and surely achieve a fuel cell having excellent durability, in which the decomposition/degradation of the polymer electrolyte membrane can be suppressed and a decrease in initial characteristics can be prevented sufficiently for a long period of time even when the fuel cell is frequently started and stopped.

More specifically, the fuel cell of the present invention includes a catalyst layer that is provided with the aforementioned decrease portion, and therefore the decomposition/degradation of the polymer electrolyte membrane of the membrane-electrode assembly can be suppressed, a decrease in initial characteristics can be prevented sufficiently for a long period of time even when the fuel cell is frequently started and stopped, and excellent durability can be provided.

Although the mechanism of the abovementioned effect of the present invention attained by forming at least one of the anode catalyst layer and the cathode catalyst layer as described above is not clearly understood, the present inventors believe that the mechanism is as follows.

It has been reported that the degradation of the membrane-electrode assembly and the catalyst-coated membrane proceeds mainly in the polymer electrolyte membrane. To be more specific, the degradation of the polymer electrolyte membrane has been reported to specifically proceed in a portion of the polymer electrolyte membrane that contacts the peripheral area of an electrode (e.g., S. Grot, Abstract p 860, Fuel Cell Seminar November 2003).

In the degradation of the polymer electrolyte membrane, fluorine, which is a component element of the polymer electrolyte membrane, is exhausted to the outside of the fuel cell in the form of fluoride ions, and thus durability can be evaluated by measuring the exhausted amount of fluorine ions and quantifying the degree of progress of the decomposition/degradation of the membrane-electrode assembly and the catalyst-coated membrane (e.g., Wen Liu et. al., J. New Mater. Electrochem. Syst., 4 (2001) 227).

It is surmised that reaction heat resulting from an electrode reaction that proceeds in the catalyst layer (at least one of the anode catalyst layer and the cathode catalyst layer) has a significant influence on the degradation of the portion of the polymer electrolyte membrane that corresponds to the peripheral area of the electrode. In the peripheral area of the catalyst layer, reaction heat is generated in a portion where the catalyst layer is present, whereas no reaction heat is generated in a portion where the catalyst layer is not present. For this reason, a temperature difference occurs locally (particularly, a local temperature difference in the plane direction that is parallel to the principal surface) in the peripheral area of the catalyst layer and the peripheral area of the polymer electrolyte membrane that contacts the peripheral area of the catalyst layer due to the presence of the portion where reaction heat is generated and that where no reaction heat is generated, or due to the difference in amount of the reaction heat. Because the state of the polymer electrolyte, such as water content, changes according to temperature, it is surmised that the portion of the polymer electrolyte membrane that contacts the peripheral area of the catalyst layer is susceptible to mechanical stress.

Further, in the peripheral area of a catalyst layer, in addition to the reaction gas (fuel gas or oxidant gas) that enters that catalyst layer through the gas diffusion layer, there is a reaction gas that enters the catalyst layer through the sides of the electrode from the gas flow path of the separator without passing through the gas diffusion layer. For this reason, an electrode reaction tends to proceed, and the current tends to be concentrated in the peripheral area of the catalyst layer than in the center area of the catalyst layer. Accordingly, it is also surmised that the peripheral area of the catalyst layer is in a state in which degradation caused by the reaction heat described above is further accelerated.

The present inventors believe that the generation of the local temperature difference caused by the reaction heat described above, which is considered to be the primary factor of the degradation of the polymer electrolyte membrane, can be reduced sufficiently by providing the peripheral area of a catalyst layer with a decrease portion in which the mass of the electrode catalyst that constitutes the catalyst layer per unit area is smaller than that in the center area of the catalyst layer. More specifically, the present inventors believe that the generation of excess reaction heat that contributes to the degradation of the polymer electrolyte membrane is sufficiently reduced by reducing the mass of the catalyst in the peripheral area of the catalyst layer (the mass of the electrode catalyst per unit area of the catalyst layer), and the local temperature difference (particularly, a local temperature difference in the plane direction that is parallel to the principal surface) in the peripheral area of the catalyst layer can be reduced sufficiently (i.e., the temperature change can be reduced sufficiently mildly), as well as the abovementioned mechanical stress applied to the peripheral area of the polymer electrolyte can be reduced sufficiently.

Based on the foregoing, by constructing a catalyst layer structure in which the amount of electrode catalyst (the mass of electrode catalyst per unit area of a catalyst layer) is reduced in the peripheral area of the catalyst layer relative to the center area of the catalyst layer as described above, it is possible to obtain a fuel cell having excellent life characteristics, that is, high durability while retaining high efficiency.

As used herein, "the peripheral area of the principal surface of at least one of the anode catalyst layer and the cathode catalyst layer is provided with a decrease portion in which the mass of the electrode catalyst per unit area of the catalyst layer decreases from the inner side toward the outer side" refers to a state in which when the catalyst layer is viewed in its cross section taken along a plane substantially parallel to the normal line direction of the principal surface of the catalyst layer, the mass of the electrode catalyst per unit area of the catalyst layer roughly decreases from the inner side (i.e., on the side closer to the center of the principal surface of the catalyst layer) toward the outer side in the peripheral area of the catalyst layer.

The state in which the mass of the electrode catalyst roughly decreases may be, for example, a state in which the mass of the electrode catalyst per unit area of the catalyst layer decreases monotonously from the inner side toward the outer side when the abovementioned cross section is viewed. As long as the effect of the present invention can be attained, the abovementioned state may include a portion in which the mass of the catalyst of an outer area is greater than that of an inner area thereof. Further, as long as the effect of the present invention can be attained, the abovementioned state may encompass a state that includes, from the inner side toward the outer side, a portion in which the mass of the catalyst is constant and does not change from the inner side toward the outer side. However, from the viewpoint of simplifying the production process, it is preferable that the mass of the catalyst decreases monotonously. When the aforesaid cross section is viewed, the mass of the catalyst may decrease discontinuously. For example, when the catalyst layer is viewed in the aforesaid cross section, the catalyst layer may have an island like shape from the inner side toward the outer side, that is, the catalyst layer may locally include a portion in which no catalyst layer is present (see the state shown in FIG. 6, which will be described later).

"The peripheral area of the principal surface of at least one of the anode catalyst layer and the cathode catalyst layer" used in the present invention refers to a peripheral area of the catalyst layer into which the reaction gas enters through the sides of the electrode from the gas flow path of the separator without passing through the gas diffusion layer.

Further, in the present invention, the "peripheral area" of the principal surface of a catalyst layer having the decrease portion and an area other than the peripheral area (hereinafter referred to as "center area") are preferably positioned in the position described below relative to the gas flow path of the separator that is disposed on that catalyst layer. In other words, as will be described later with reference to FIG. 1, it is preferable in the present invention that the catalyst layer having the decrease portion is segmented into two areas: a "center area" that is located inwardly (i.e., on the side closer to the center of the principal surface of the catalyst layer) relative to the outer edge of the outermost gas flow path (i.e., the gas flow path located outermost from the center of the principal surface of the separator) among the gas flow paths formed in the separator that is disposed on the catalyst layer; and a "peripheral area" that is located outwardly from that outer edge (i.e., on the outer side with respect to the center of the principal surface of the catalyst layer).

By positioning the peripheral area in the abovementioned position, the center area of the principal surface of the catalyst layer (i.e., the portion in which the mass of the electrode catalyst per unit area of the catalyst layer is constant) can be positioned in the portion (in which an electrode reaction proceeds mainly) of the catalyst layer having the decrease portion that contacts the gas flow path of the separator.

In this case, by forming the center area (the portion to be in contact with the gas flow path of the separator) of the catalyst layer such that the mass of the electrode catalyst per unit area of the catalyst layer is constant, the catalyst layer can be formed more easily. From the viewpoint of simplifying the production step, the catalyst layer is produced preferably using only a single type of catalyst layer forming ink that contains constituent materials of the catalyst layer. In this case, even when a single type of catalyst layer forming ink is used, it is possible to easily form a catalyst layer in which the mass of the electrode catalyst per unit area of the catalyst layer is constant and the thickness of the center area is constant. When the thickness of the center area of the catalyst layer can be made constant, the contact resistance with the separator can be reduced easily. When the thickness of the center area of the catalyst layer can be made constant, variations in clamping pressure applied to the plane of the center area of the catalyst layer can be reduced easily. This prevents a large clamping pressure from being applied to a particular portion of the polymer electrolyte membrane, and thus good durability is attained easily.

Reaction heat serving as a factor that causes the degradation of the polymer electrolyte membrane is generated in both the anode catalyst layer and the cathode catalyst layer. Accordingly, the durability of the polymer electrolyte membrane is improved by applying a catalyst layer structure in which the mass of the electrode catalyst per unit area of the catalyst layer is changed in the plane direction of the catalyst layer to at least one of the anode catalyst layer and the cathode catalyst layer. Further, the durability can be improved more effectively by applying the catalyst layer structure in which the mass of the electrode catalyst per unit area of the catalyst layer is changed in the plane direction of the catalyst layer to both the anode catalyst layer and the cathode catalyst layer.

The present invention further provides a membrane-electrode assembly and a catalyst-coated membrane that can be incorporated in the abovementioned fuel cell of the present invention.

In the membrane-electrode assembly of the present invention, by configuring at least one of the anode catalyst layer and the cathode catalyst layer as described above, it is possible to easily and surely provide a fuel cell having excellent durability, in which the decomposition/degradation of the polymer electrolyte membrane in the membrane-electrode assembly can be suppressed and a decrease in initial characteristics can be prevented sufficiently for a long period of time even when the fuel cell is frequently started and stopped.

Further, in the catalyst-coated membrane of the present invention, by configuring at least one of the anode catalyst layer and the cathode catalyst layer as described above, it is possible to easily and surely provide a fuel cell having excellent durability, in which the decomposition/degradation of the polymer electrolyte membrane can be suppressed and a decrease in initial characteristics can be prevented sufficiently for a long period of time even when the fuel cell is frequently started and stopped.

The present invention further provides a fuel cell stack that includes a plurality of the abovementioned fuel cells of the present invention.

Because the fuel cell stack of the present invention includes the abovementioned membrane-electrode assembly of the present invention, the decomposition/degradation of the polymer electrolyte membrane in the membrane-electrode assembly is suppressed, and a decrease in initial characteristics can be prevented sufficiently even when the fuel cell is frequently started and stopped, it is therefore possible to provide excellent durability.

Effect of the Invention

According to the present invention, it is possible to provide a fuel cell that can exert sufficiently stable cell performance for a long period of time, and has excellent durability, in which the decomposition/degradation of the polymer electrolyte membrane can be suppressed and a decrease in initial characteristics can be prevented sufficiently for a long period of time even when the fuel cell is frequently started and stopped.

According to the present invention, it is also possible to provide a catalyst-coated membrane and a membrane-electrode assembly that can surely achieve a fuel cell having excellent durability, in which the decomposition/degradation of the polymer electrolyte membrane can be suppressed and a decrease in the initial characteristics can be prevented sufficiently for a long period of time even when the fuel cell is frequently started and stopped.

According to the present invention, it is also possible to provide a fuel cell stack that includes a plurality of the above-mentioned fuel cells of the present invention and has excellent durability, in which the decomposition/degradation of a polymer electrolyte membrane can be suppressed and a decrease in initial characteristics can be prevented sufficiently for a long period of time even when the fuel cell is frequently started and stopped.

BRIEF DESCRIPTION OF THE DRAWINGS

FIG. 16 is an optical micrograph of a conventional catalyst-coated membrane (Comparative Example 1) as viewed from a direction substantially normal to the principal surface of the polymer electrolyte membrane 111, illustrating a portion that includes the peripheral area of the cathode catalyst layer 112a.

BEST MODE CARRYING OUT THE INVENTION

Figure 1:
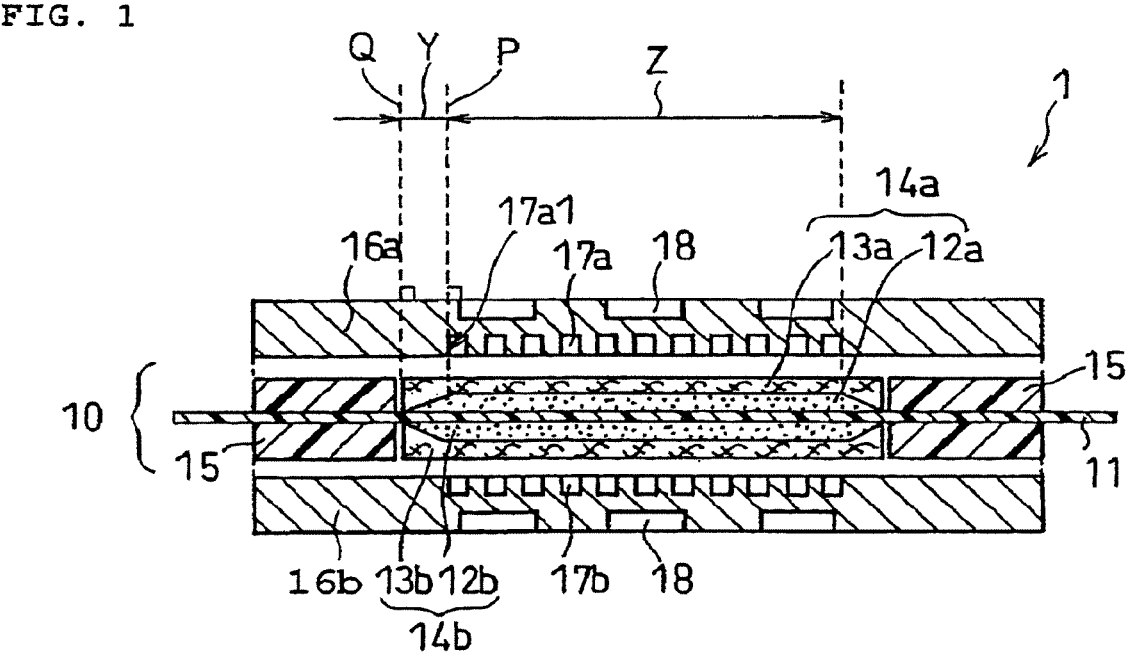
FIG. 1 is a schematic cross-sectional view illustrating an example of the basic structure of a unit cell that can be incorporated in a polymer electrolyte fuel cell according to a preferred embodiment of the present invention.

Preferred embodiments of the present invention will be described below with reference to the accompanying drawings. It should be noted that the same reference numerals are assigned to the same or corresponding parts, so that overlapping description may be omitted.

Figure 2:
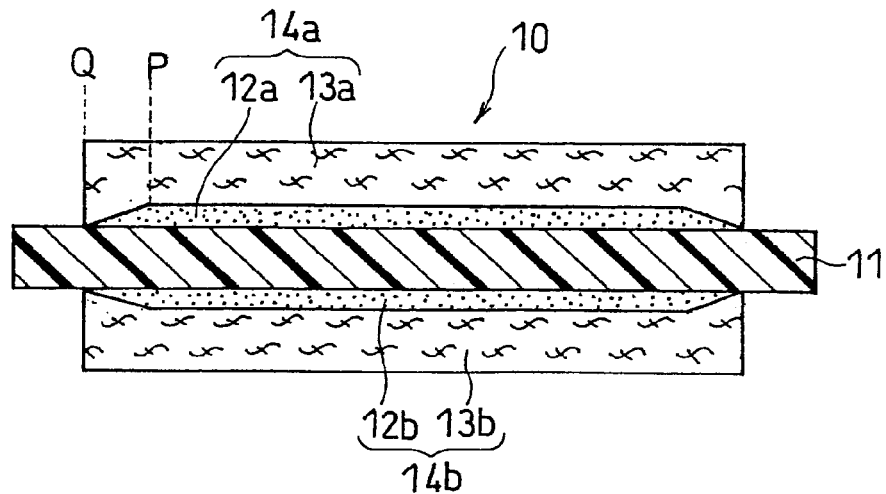
FIG. 2 is a schematic cross-sectional view illustrating an example of the basic structure of a membrane-electrode assembly that can be incorporated in the fuel cell 1 shown in FIG. 1.
Figure 3:
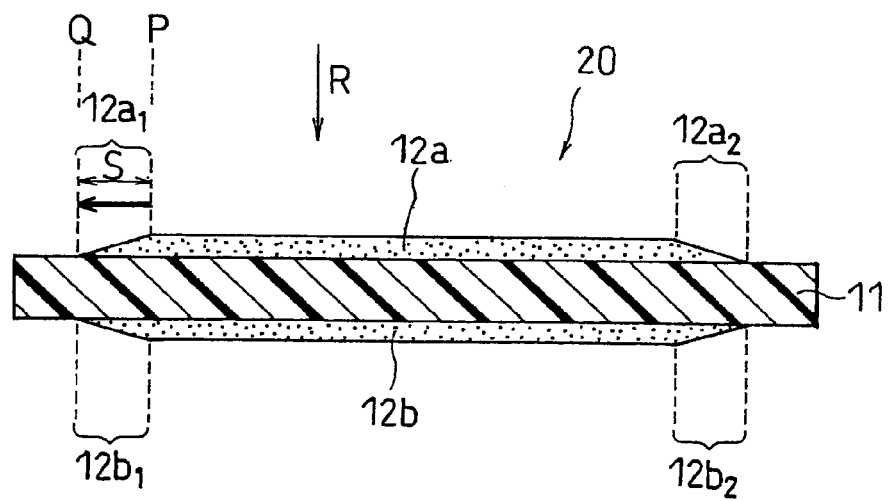
FIG. 3 is a schematic cross-sectional view illustrating an example of a catalyst-coated membrane that constitutes the membrane-electrode assembly 10 shown in FIG. 2.

FIG. 1 is a schematic cross-sectional view illustrating an example of the basic structure of a fuel cell (unit cell) according to a preferred embodiment of the present invention. FIG. 2 is a schematic cross-sectional view illustrating an example of the basic structure of a membrane-electrode assembly (MEA) according to the present embodiment that can be incorporated in the fuel cell 1 shown in FIG. 1. FIG. 3 is a schematic cross-sectional view illustrating an example of a catalyst-coated membrane (CCM) according to the present embodiment that constitutes the membrane-electrode assembly 10 shown in FIG. 2.

As shown in FIG. 3, the catalyst-coated membrane 20 according to the present embodiment is configured mainly of a substantially rectangular cathode catalyst layer $12a$, a substantially rectangular anode catalyst layer $12b$, and a substantially rectangular polymer electrolyte membrane 11 that is interposed between the cathode catalyst layer $12a$ and the anode catalyst layer $12b$.

The polymer electrolyte membrane 11 is not limited to a specific membrane, and it is possible to use any polymer electrolyte membrane that can be incorporated in conventional solid polymer fuel cells. For example, polymer electrolyte membranes made of perfluorocarbon sulfonic acid (e.g., Nafion (trade name) available from E.I. Du Pont de Nemours & Co. Inc., USA, Aciplex (trade name) available from Asahi Kasei Corporation, and GSII (trade name) available from Japan Gore-Tex Inc., etc.) can be used.

The polymer electrolyte membrane 11 is a solid electrolyte and hydrogen ion conductive, and thus is capable of selectively transporting hydrogen ions. Hydrogen ions that are produced in the anode catalyst layer $12b$ of the membrane-electrode assembly 20 during power generation migrate through the polymer electrolyte membrane 11 to the cathode catalyst layer $12a$.

As the polymer electrolyte that constitutes the polymer electrolyte membrane 11, polymer electrolytes having, as the cation exchange group, a sulfonic acid group, carboxylic acid group, phosphonic acid group and sulfone imide group are preferably used, for example. Particularly preferred is a polymer electrolyte having a sulfonic acid group from the viewpoint of hydrogen ion conductivity. The polymer electrolyte having a sulfonic acid group preferably has an ion exchange capacity of 0.5 to 1.5 meq/g dry resin. The polymer electrolyte having an ion exchange capacity of 0.5 meq/g dry resin or greater is preferred because it is easy to maintain the resistance value of the catalyst layer at a low level during power generation. The polymer electrolyte having an ion exchange capacity of 1.5 meq/g dry resin or less is preferred because good gas diffusion characteristics are secured sufficiently in the catalyst layer (the cathode catalyst layer 12a, the anode catalyst layer 12b) while maintaining the water content of the polymer electrolyte membrane 11 at an appropriate level. For the same reason as described above, it is particularly preferable that the ion exchange capacity is 0.8 to 1.2 meq/g dry resin.

The polymer electrolyte is preferably a perfluorocarbon copolymer that includes a polymer unit based on a perfluorovinyl compound represented by $CF_2=CF-(OCF_2CFX)_m-O_p-(CF_2)_n-SO_3H$ (where m is an integer from 0 to 3, n is an integer from 1 to 12, p is 0 or 1, and X is a fluorine atom or trifluoromethyl group) and a polymer unit based on tetrafluoroethylene represented by $CF_2=CF_2$. The fluorocarbon polymer may contain, for example, an oxygen atom with an ether-bond, and the like.

Preferred examples of the perfluorovinyl compound include compounds represented by the following formulas (1) to (3). In the following formulas, q is an integer from 1 to 8, r is an integer from 1 to 8, and t is an integer from 1 to 3.

$$CF_2=CFO(CF_2)_q-SO_3H \qquad (1)$$

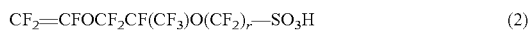

$$CF_2=CFOCF_2CF(CF_3)O(CF_2)_r-SO_3H \qquad (2)$$

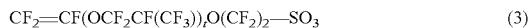

$$CF_2=CF(OCF_2CF(CF_3))_tO(CF_2)_2-SO_3 \qquad (3)$$

The polymer electrolyte membrane 11 may be made of a single type or multiple types of polymer electrolytes, and may include a reinforcing material (filler) therein. The configuration (e.g., the degree of density or regularity) of the reinforcing material of the polymer electrolyte membrane 11 is not limited to a specific configuration.

The material that constitutes the reinforcing material is not limited to a specific material, but for example, polytetrafluoroethylene, polyfluoroalkoxyethylene, polyphenylsulfide or the like can be used. The form of the reinforcing material can be, but not limited to, for example, a porous reinforcing material, fibrous reinforcing material, and fibrous, filamentous and spherical reinforcing particles. As used herein, fibrous fiber refers to a fiber having protruding fibrils (small fibers) on the surface thereof (i.e., fibrillated fiber) in which very fine air spaces (pores) are formed between the fibrils. For example, cellulose fiber is a bundle of multiple fibrils, and there are very fine air spaces (pores) between the fibrils.

The cathode catalyst layer 12a and the anode catalyst layer 12b are configured mainly of a catalyst-carrying carbon obtained by causing a carbon powder to carry an electrode catalyst (e.g., platinum-based metal catalyst), and a hydrogen ion conductive polymer electrolyte.

As the hydrogen ion conductive polymer electrolyte that is included in the cathode catalyst layer 12a and the anode catalyst layer 12b and is attached to the catalyst-carrying carbon, the same polymer electrolyte as that used for the polymer electrolyte membrane 11 can be used. The polymer electrolytes used for the cathode catalyst layer 12a, the anode catalyst layer 12b and the polymer electrolyte membrane 11 may be the same or different. For example, commercially available polymer electrolytes can be used such as Nafion (trade name) available from E.I. Du Pont de Nemours & Co. Inc., USA, Flemion (trade name) available from Asahi Glass Co. Ltd., and Aciplex (trade name) available from Asahi Kasei Corporation.

As described above, in the catalyst-coated membrane 20 of the present embodiment, the cathode catalyst layer 12a and the anode catalyst layer 12b include a catalyst-carrying carbon including a carbon powder and an electrode catalyst carried on the carbon powder, and a hydrogen ion conductive polymer electrolyte attached to the catalyst-carrying carbon. Further, as described earlier, the peripheral area of the cathode catalyst layer 12a and the peripheral area of the anode catalyst layer 12b are provided with a portion (decrease portion) in which the mass of the electrode catalyst per unit area of the catalyst layer decreases roughly from the inner side toward the outer side in a direction substantially parallel to the principal surface of the polymer electrolyte membrane 11 (i.e., the portions indicated by $12a_1$, $12a_2$, $12b_1$ and $12b_2$ in FIG. 3).

The cathode catalyst layer 12a of the catalyst-coated membrane 20 of the present embodiment will be described as a typical example. When a cross section taken along a plane substantially parallel to the direction normal to the principal surface of the cathode catalyst layer 12a of the fuel cell 1 is viewed as shown in FIG. 1, the cathode catalyst layer 12a has two areas: a "center area Z" that is located inwardly (i.e., on the side closer to the center of the principal surface of the catalyst layer 12a) relative to the outer edge (portion P indicated by a dotted line in FIG. 1) of the outermost gas flow path 17a1 (i.e., the gas flow path 17a1 located outermost from the center of the principal surface of the separator 16) among the gas flow paths 17a formed in the plate-like cathode-side separator 16a; and a "peripheral area Y" that is located outwardly (i.e., on the outer side with respect to the center of the principal surface of the cathode catalyst layer 12a) from the portion P.

The anode catalyst layer 12b also has the same configuration as that of the cathode catalyst layer 12a. The portion Q indicated by a dotted line in FIG. 1 represents the position of the outer edge of the cathode gas diffusion layer 13a and the anode gas diffusion layer 13b.

In other words, in the present embodiment, the outer edge Q of the cathode gas diffusion layer 13a and the anode gas diffusion layer 13b is located outwardly from the outer edge (portion P) of the outermost gas flow path 17a1 among the gas flow paths 17 formed in the separator 16, and the peripheral area Y is located between the portion Q and the portion P.

In the catalyst-coated membrane 20, as shown in FIG. 3, "the thickness of the peripheral area" of the cathode catalyst layer 12a and "the thickness of the peripheral area" of the anode catalyst layer 12b are decreased from the inner side toward the outer side. Thereby, "the decrease portion in which the mass of the electrode catalyst per unit area of the catalyst layer roughly decreases from the inner side toward the outer side" is formed in the peripheral area of the cathode catalyst layer 12a and the peripheral area of the anode catalyst layer 12b.

As shown in FIG. 3 as an example, the thickness of the peripheral area of each catalyst layer (the peripheral area of the cathode catalyst layer 12a and the peripheral area of the anode catalyst layer 12b) may be decreased monotonously (i.e., the mass of the electrode catalyst per unit area of each catalyst layer may be decreased monotonously) from the inner side toward the outer side (it may be decreased substantially linearly as shown in FIG. 3, or substantially curvilinearly).

In FIG. 3, the distance S from the outer edge (portion P) of the center area Z of the cathode catalyst layer 12a to the outer edge of the decrease portion (the distance that is substantially perpendicular to a side of the substantially rectangular shape) matches the distance from the portion P to the portion Q, but the distance S of the decrease portion from the point P may not necessarily match the distance from the portion P to the portion Q, and may be shorter. In other words, the distance S from the portion P may vary within the distance between the portion P and the portion Q along the peripheral area of the principal surface of the cathode catalyst layer 12a.

It is preferable that the decrease portion of the peripheral area Y is disposed on the principal surface such that the following conditions are satisfied. Specifically, as shown in FIG. 4, in each of sixteen unit peripheral areas $Y_1$ to $Y_{16}$ that are obtained by dividing four sides of the peripheral area Y of the principal surface of the substantially rectangular cathode catalyst layer 12a into four equal parts, the distance S from the outer edge (portion P) of the center area Z of the cathode catalyst layer 12a to the outer edge of the decrease portion is preferably 200 to 1250 μm at the longest and 0 to 200 μm at the shortest.

Figure 4:
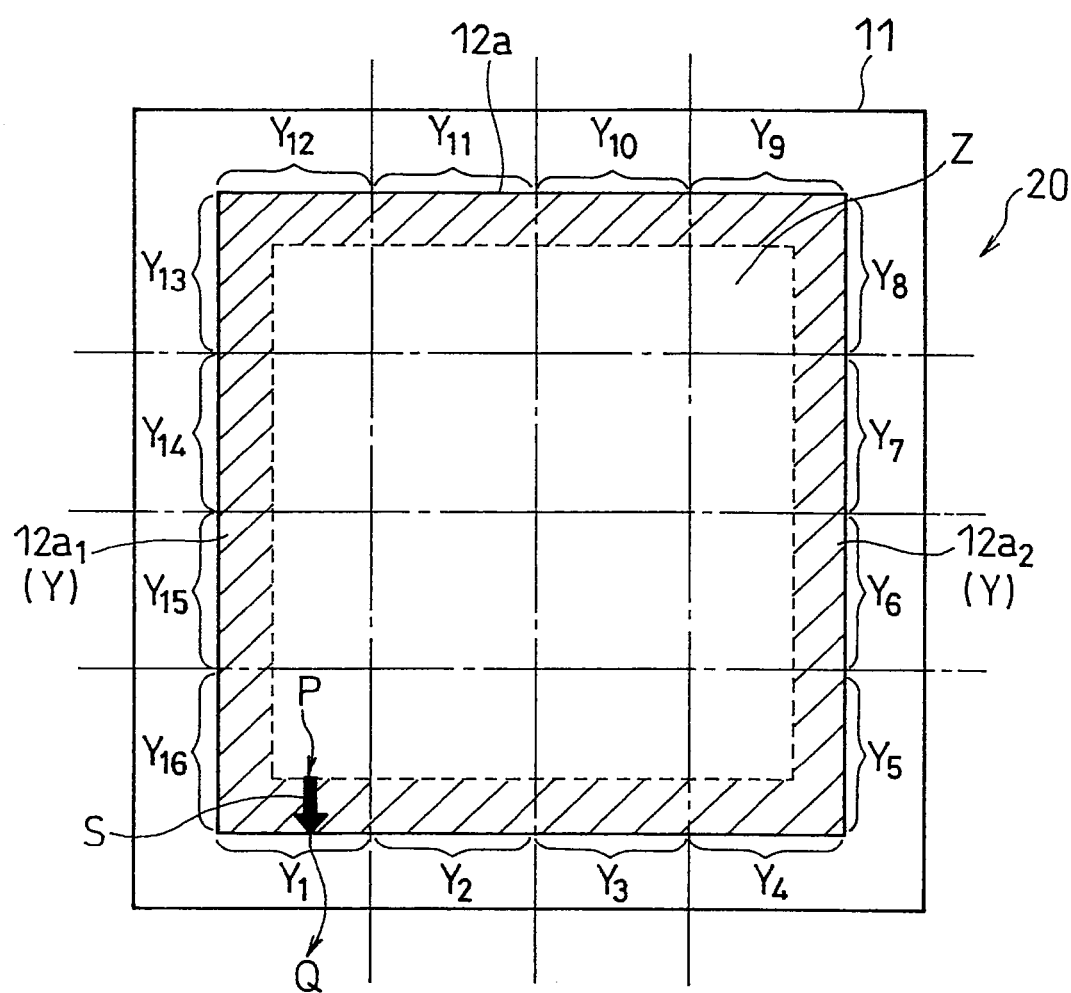
FIG. 4 is a schematic front view of the catalyst-coated membrane 20 as viewed from the direction indicated by arrow R in FIG. 3.

FIG. 4 is a schematic front view of the catalyst-coated membrane 20 as viewed from the direction indicated by arrow R in FIG. 3. FIG. 4 is also used to illustrate an example of a preferred method for verifying the presence/absence of the decrease portion in which the amount of catalyst decreases from the inner side toward the outer side in the peripheral area of the catalyst layer.

Figure 5:
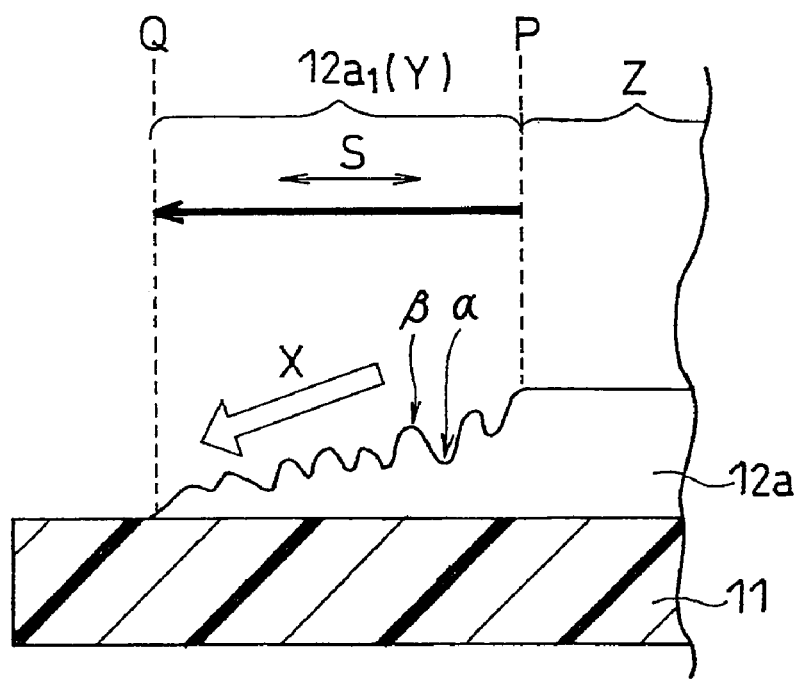
FIG. 5 is an enlarged cross-sectional view of a relevant part, illustrating a peripheral area $12a_1(Y)$ of the cathode catalyst layer $12a$ of the catalyst-coated membrane 20 shown in FIG. 3.

The thickness of the peripheral area of each catalyst layer can be decreased from the inner side toward the outer side in a manner other than that described with reference to FIG. 3. For example, as shown in FIGS. 5 to 7, the thickness may be decreased such that a portion in which the thickness of the cathode catalyst layer 12a or the anode catalyst layer 12b is increased is partially present as long as the thickness of the catalyst layer is decreased as a whole (the mass of the electrode catalyst per unit area of the catalyst layer is decreased as a whole) from the inner side toward the outer side in the peripheral area of each catalyst layer.

A detailed description will be given below with reference to FIGS. 5 to 7. FIG. 5 is an enlarged cross-sectional view of a relevant part, illustrating a peripheral area $12a_1$(Y) of the cathode catalyst layer 12a. As shown in FIG. 5, in the peripheral area $12a_1$(Y) of the cathode catalyst layer 12a, the thickness of the cathode catalyst layer 12a may be decreased roughly from the inner side toward the outer side of the cathode catalyst layer 12a as indicated by arrow X. As long as the effect of the present invention can be attained, the cathode catalyst layer 12a may include a portion in which the thickness of an outer area (the area indicated by arrow β) of the cathode catalyst layer 12a is larger than that of an inner area (the area indicated by arrow α) thereof. Further, as long as the effect of the present invention can be attained, the cathode catalyst layer 12a may include a portion in which the thickness of an outer area (the area indicated by arrow β) of the catalyst layer 12a does not change from that of an inner area (the area indicated by arrow α) thereof and is constant, only if the thickness of the cathode catalyst layer 12a is roughly decreased. This applies to the peripheral area $12a_2$ of the cathode catalyst layer 12a and the peripheral areas $12b_1$ and $12b_2$ of the anode catalyst layer 12b. However, from the viewpoint of simplifying the production process, it is preferable that the thickness decreases monotonously.

Figure 6:
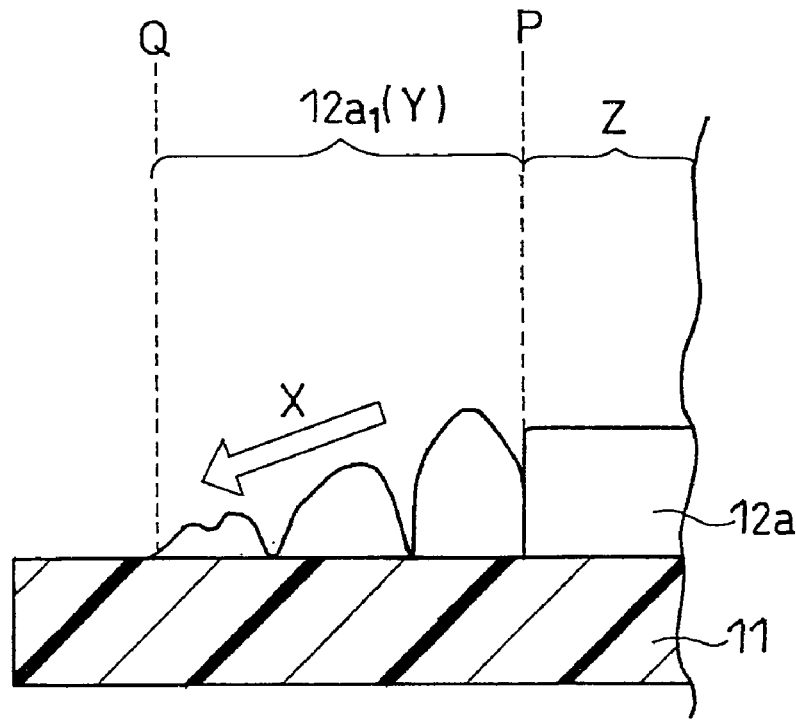
FIG. 6 is an enlarged cross-sectional view of a relevant part, illustrating a variation of the peripheral area $12a_1(Y)$ of the cathode catalyst layer $12a$ of the catalyst-coated membrane 20 shown in FIG. 3.

FIG. 6 is an enlarged cross-sectional view of a relevant part, illustrating a variation of the peripheral area $12a_1$(Y) of the cathode catalyst layer 12a. As shown in FIG. 6, when the peripheral area $12a_1$(Y) of the cathode catalyst layer 12a is viewed in a cross section taken along a plane substantially parallel to the direction normal to the principal surface of the cathode catalyst layer 12a, the catalyst layer may be in the form of islands to form a state in which the catalyst layer is locally absent as viewed from the inner side toward the outer side as indicated by arrow X. With this, a state in which the thickness of the peripheral area $12a_1$(Y) of the cathode catalyst layer 12a decreases roughly as a whole may be formed. This applies to the peripheral area $12a_2$ of the cathode catalyst layer 12a and the peripheral areas $12b_1$ and $12b_2$ of the anode catalyst layer 12b.

Figure 7:
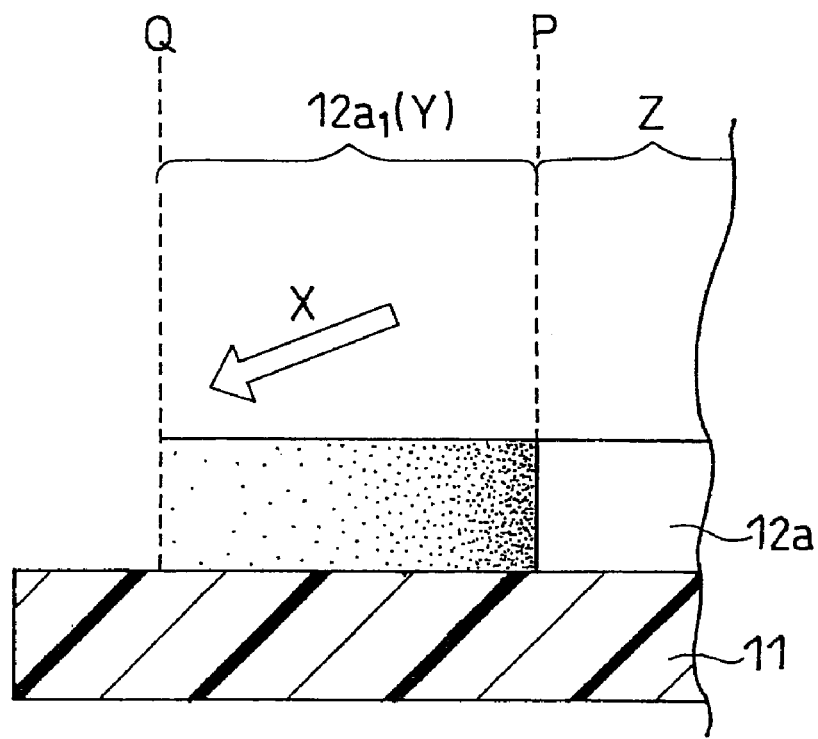
FIG. 7 is an enlarged cross-sectional view of a relevant part, illustrating another variation of the peripheral area $12a_1$ (Y) of the cathode catalyst layer $12a$ of the catalyst-coated membrane 20 shown in FIG. 3.

FIG. 7 is an enlarged cross-sectional view of a relevant part, illustrating another variation of the peripheral area $12a_1$ (Y) of the cathode catalyst layer 12a. As shown in FIG. 7, when the peripheral area $12a_1$(Y) of the cathode catalyst layer 12a is viewed in a cross section taken along a plane substantially parallel to the direction normal to the principal surface of the cathode catalyst layer 12a, a state can be formed in which the catalyst density of the peripheral area $12a_1$(Y) is decreased roughly from the inner side toward the outer side as indicated by arrow X while the thickness of the peripheral area $12a_1$(Y) and the thickness of the center area Z are made substantially the same. This applies to the peripheral area $12a_2$ of the cathode catalyst layer 12a and the peripheral areas $12b_1$ and $12b_2$ of the anode catalyst layer 12b.

In the present embodiment, the mass per unit area of the carbon powder as an electrode catalyst carrier may be or may not be decreased from the inner side to the outer side in the peripheral area of the catalyst layer in proportion to the mass of the electrode catalyst. Likewise, the mass of per unit area the polymer electrolyte that is included in the catalyst layer may be or may not be decreased from the inner side to the outer side in the peripheral area of the catalyst layer in proportion to the mass of the electrode catalyst. From the viewpoint of hydrogen ion conductivity and flooding, it is preferable that the mass of the polymer electrolyte is increased/decreased in proportion to the mass of the catalyst-carrying carbon.

As the carbon powder (conductive carbon particles), serving as a carrier, for the cathode catalyst layer 12a and the anode catalyst layer 12b, a conductive carbon material having developed micropores is preferably used. Examples thereof include carbon black, activated carbon, carbon fiber and carbon tube. Examples of the carbon black include channel black, furnace black, thermal black and acetylene black. The activated carbon can be obtained by subjecting various materials containing carbon atoms to carbonization and activation.

The carbon powder preferably has a specific surface area of 50 to 1500 m²/g. The carbon powder having a specific surface area of 50 m²/g or greater is preferred because the electrode catalyst-carrying rate can be increased easily, and the output characteristics of the resulting cathode catalyst layer 12a and anode catalyst layer 12b can be secured further sufficiently. The carbon powder having a specific surface area of 1500 m²/g or less is preferred because micropores having a sufficient size can be secured more easily and the carbon powder can be covered with the polymer electrolyte more easily, and therefore the output characteristics of the cathode catalyst layer 12a and the anode catalyst layer 12b can be secured further sufficiently. For the same reason as described above, it is particularly preferable that the specific surface area is 200 to 900 m²/g.

As the electrode catalyst for the cathode catalyst layer 12a and the anode catalyst layer 12b, it is preferable to use platinum or a platinum alloy. The platinum alloy is preferably an alloy of platinum and at least one metal selected from the group consisting of platinum-group metals except platinum (ruthenium, rhodium, palladium, osmium, iridium), iron, titanium, gold, silver, chromium, manganese, molybdenum, tungsten, aluminum, silicon, rhenium, zinc and tin. The platinum alloy may contain an intermetallic compound made of platinum and a metal listed above.

Alternatively, an electrode catalyst mixture that is obtained by mixing an electrode catalyst made of platinum with an electrode catalyst made of a platinum alloy may be used. The electrode catalyst used for the cathode catalyst layer 12a and that used for the anode catalyst layer 12b may be the same or different.

In order to make the cathode catalyst layer 12a and the anode catalyst layer 12b highly reactive, the electrode catalyst preferably has a primary particle size of 1 to 20 nm, and particularly preferably 2 to 10 nm so as to secure a large surface area to increase reactivity.

The catalyst-carrying rate of the catalyst-carrying carbon (the proportion of the mass of the carried electrode catalyst based on the total mass of the catalyst-carrying carbon) is preferably 20 to 80 mass %, and particularly preferably 40 to 60 mass %. A high cell output can be obtained when the catalyst-carrying rate falls within that range. When the catalyst-carrying rate is 20 mass % or greater, a sufficient cell output can be achieved reliably. When the catalyst-carrying rate is 80 mass % or less, the particles of the electrode catalyst can be carried on the carbon powder with better dispersibility, and therefore the effective catalytic area can be further increased.

As the hydrogen ion conductive polymer electrolyte that is included in the cathode catalyst layer 12a and the anode catalyst layer 12b and is attached to the catalyst-carrying carbon, the same polymer electrolyte as that used for the polymer electrolyte membrane 11 can be used. The polymer electrolytes used for the cathode catalyst layer 12a, the anode catalyst layer 12b and the polymer electrolyte membrane 11 may be the same or different. For example, commercially available polymer electrolytes can be used such as Nafion (trade name) available from E.I. Du Pont de Nemours & Co. Inc., USA, Flemion (trade name) available from Asahi Glass Co. Ltd., and Aciplex (trade name) available from Asahi Kasei Corporation.

It is preferable that the polymer electrolyte is added in a mass proportional to the mass of the catalyst-carrying carbon that constitutes the catalyst layer so as to cover the catalyst-carrying carbon particle and secure a three dimensional hydrogen ion conduction path.

Specifically, the mass of the polymer electrolyte that constitutes the catalyst layer is preferably not less than 0.2 times and not greater than 2.0 times the mass of the catalyst-carrying carbon. When the mass of the polymer electrolyte falls within this range, a high cell output can be obtained. When the mass of the polymer electrolyte is not less than 0.2 times, it is easy to secure sufficient hydrogen ion conductivity. When the mass of the polymer electrolyte is not greater than 2.0 times, flooding can be avoided more easily, and therefore a high cell output can be achieved.

In the cathode catalyst layer 12a and the anode catalyst layer 12b of the present embodiment, it is sufficient that the polymer electrolyte is partially attached to the surface of the catalyst-carrying carbon particles. That is, the polymer electrolyte may cover at least part of the catalyst-carrying carbon particle, and it may not necessarily cover the entire catalyst-carrying carbon particles. Of course, the polymer electrolyte may cover the entire surface of the catalyst-carrying carbon particles.

Next, as shown in FIG. 2, a membrane-electrode assembly 10 of the present embodiment is configured by forming a gas diffusion layer 13a having air permeability and electron conductivity on the outer surfaces of the cathode catalyst layer 12a and the anode catalyst layer 12b, using, for example, carbon paper treated for water repellency. The cathode catalyst layer 12a and the gas diffusion layer 13b are combined to form a cathode 14a, and the anode catalyst layer 12b and the gas diffusion layer 13 are combined to form an anode 14b.

As the gas diffusion layer 13, in order to impart gas permeability, a conductive porous substrate that is produced using a carbon fine powder having a developed structure, a pore-forming material, carbon paper, carbon cloth or the like, can be used. In order to impart water drainage capability, a water repellent polymer as typified by fluorocarbon resin or the like may be dispersed in the gas diffusion layer 13. In order to impart electron conductivity, the gas diffusion layer 13 may be configured using an electron conductive material such as carbon fiber, metal fiber or a carbon fine powder. Further, a water repellent carbon layer made of a water repellent polymer and a carbon powder may be provided on the surface of the gas diffusion layer 13 to be in contact with the cathode catalyst layer 12a or the anode catalyst layer 12b. The cathode-side gas diffusion layer and the anode-side gas diffusion layer may be the same or different.

As shown in FIG. 1, the fuel cell 1 according to the present embodiment is configured of a membrane-electrode assembly 10, a gasket 15, and a pair of separators 16 (anode-side separator 16b and cathode-side separator 16a). The gasket 15 is disposed on the outer periphery of the cathode 14a and the anode 14b with the polymer electrolyte membrane 11 interposed therebetween so as to prevent the supplied fuel gas and oxidant gas from leaking out and to prevent them from mixing with each other. The gasket 15 is combined in advance with the cathode 14a or the anode 14b and the polymer electrolyte membrane 11. This entire combination may also be called a "membrane-electrode assembly 10.

A pair of separators 16 (the anode-side separator 16b and the cathode-side separator 16a) for mechanically fixing the membrane-electrode assembly 10 are disposed on the outer surfaces of the membrane-electrode assembly 10. In the portion of the separator 16 that contacts the membrane-electrode assembly 10, a gas flow path 17 (the gas flow path 17b formed in the anode-side separator 16b and the gas flow path 17a formed in the cathode-side separator 16a) for supplying an oxidant gas to the cathode 14a and a fuel gas to the anode 14b and removing a gas containing an electrode reaction product and unreacted reaction gas from the reaction site to the outside of the cathode 14a and the anode 14b is formed. Although the gas flow path 17 may be formed independently of the separator 16, the gas flow path 17 is formed by providing a groove on a surface of the separator 16 in FIG. 1. On the side of the separator 16 that is opposite from the membrane-electrode assembly 10, a cooling water flow path 18 is formed by providing a groove by cutting.

By fixing the membrane-electrode assembly 10 with a pair of separators 16 as described above, and supplying a fuel gas to the gas flow path 17b of the anode-side separator 16b, and a oxidant gas to the gas flow path 17a of the cathode-side separator 16a, an electromotive force of about 0.7 to 0.8 V can be generated with a single fuel cell at a practical current density of several tens to several hundreds $mA/cm^2$. However, the polymer electrolyte fuel cell requires to provide a voltage of several to several hundreds volts when used as a power source. For this reason, the required number of the fuel cells 1 is connected in series to form a fuel cell stack (described later in FIG. 12) for practical use.

In order to supply reaction gases to the gas flow paths 17, a manifold is necessary in which a pipe for supplying a reaction gas is branched into a number corresponding to the number of the separators 16 used and the branched ends are directly connected to the gas flow paths 17 on the separators 16. The present invention may employ both an external manifold and an internal manifold.

Figure 8:
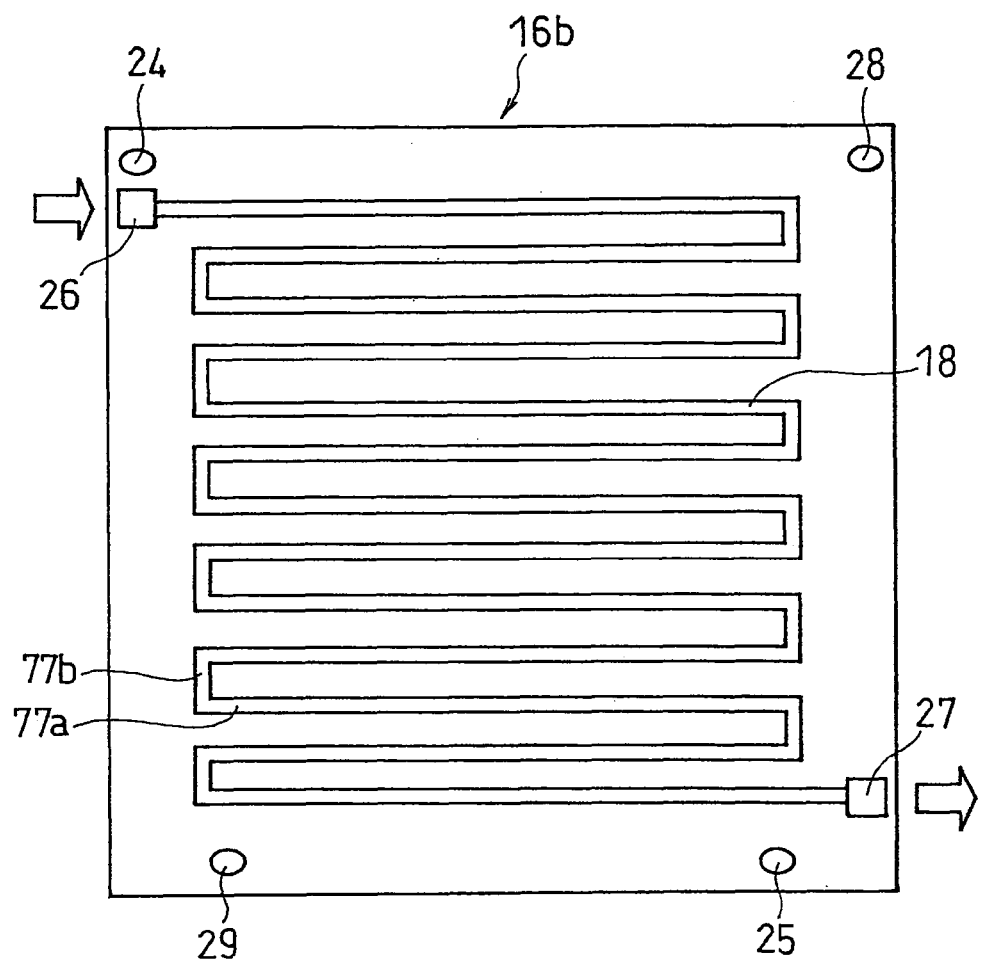
FIG. 8 is a front view of a principal surface of the anode-side separator 16b of the fuel cell shown in FIG. 1 as viewed from the side on which a cooling water flow path 18 is formed.
Figure 9:
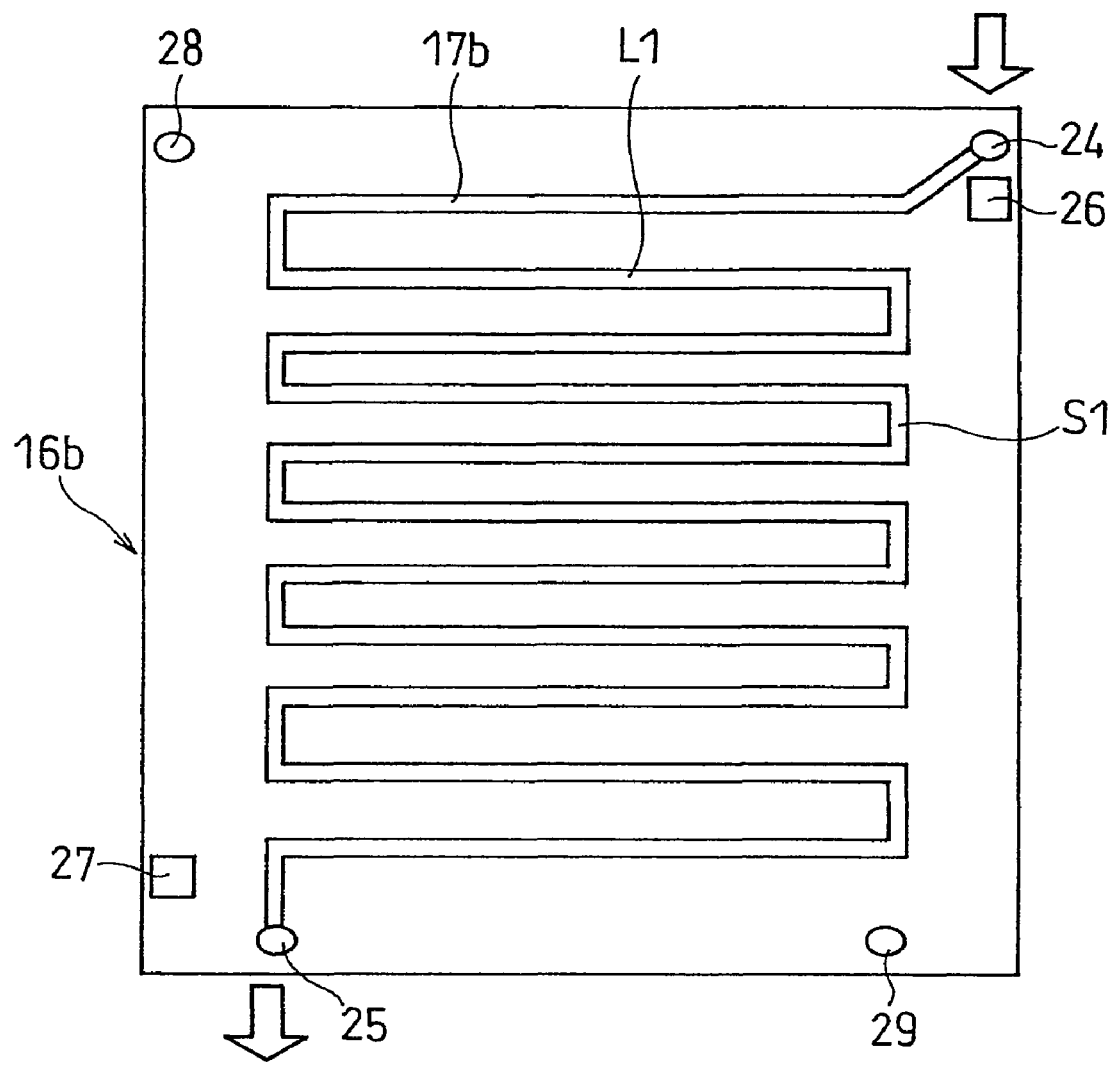
FIG. 9 is a front view of a principal surface of the anode-side separator 16b of the fuel cell shown in FIG. 1 as viewed from the side on which a gas flow path 17b is formed.
Figure 10:
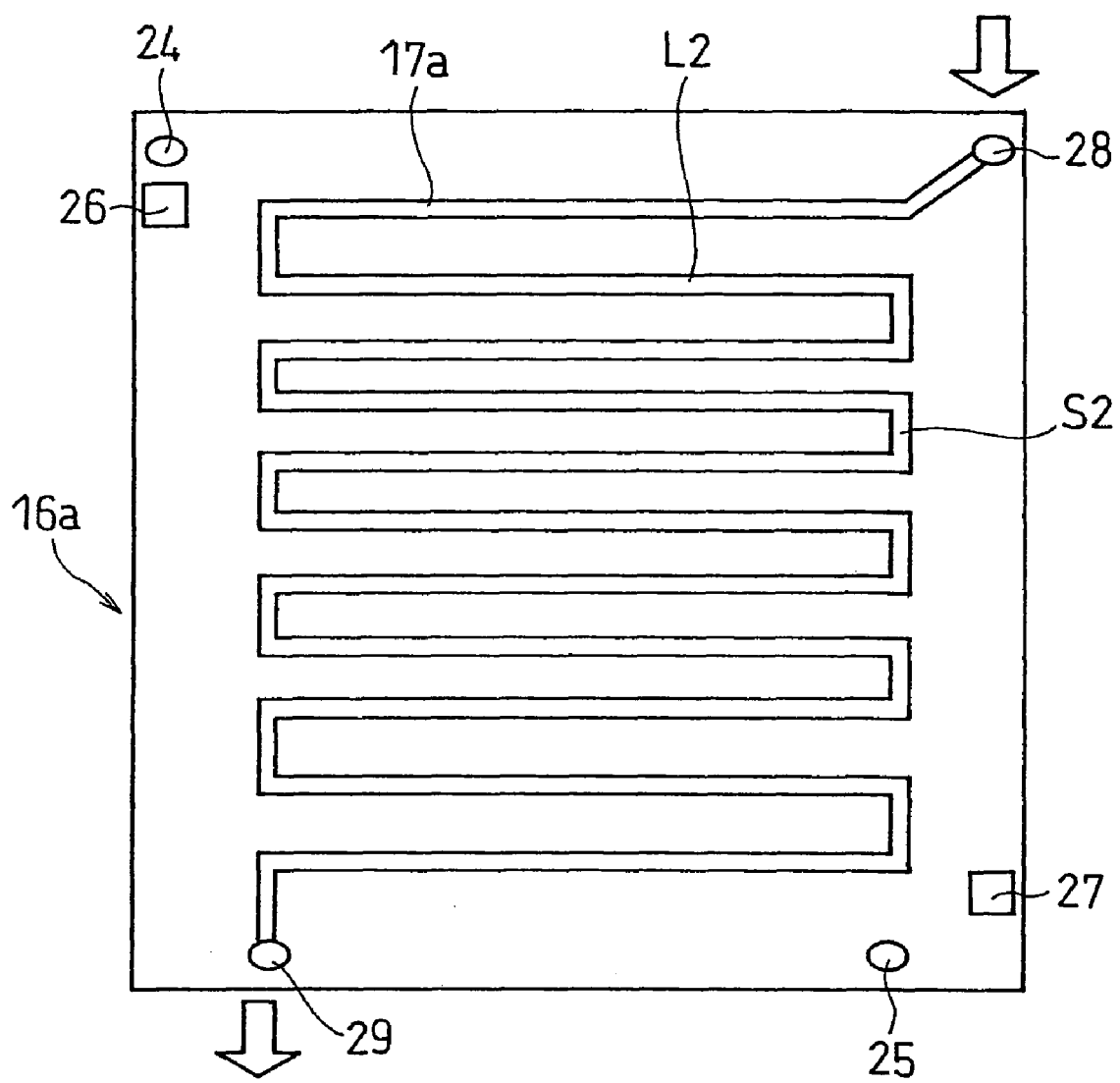
FIG. 10 is a front view of a principal surface of the cathode-side separator 16a of the fuel cell shown in FIG. 1 as viewed from the side on which a gas flow path 17a is formed.
Figure 11:
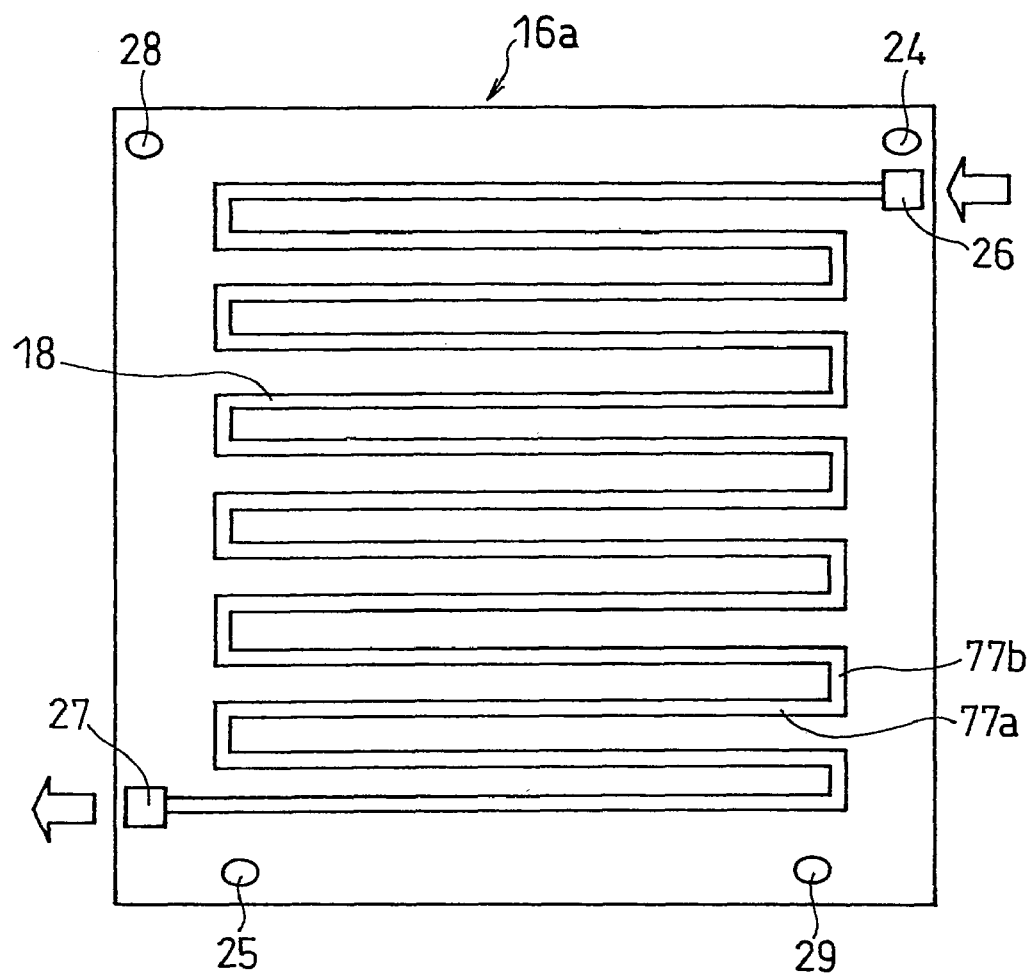
FIG. 11 is a front view of a principal surface of the cathode-side separator 16a of the fuel cell shown in FIG. 1 as viewed from the side on which a cooling water flow path 18 is formed.

FIG. 8 is a front view of a principal surface of the anode-side separator 16b of the fuel cell 1 shown in FIG. 1 as viewed from the side on which the cooling water flow path 18 is formed. FIG. 9 is a front view of a principal surface of the anode-side separator 16a of the fuel cell 1 shown in FIG. 1 as viewed from the side on which the gas flow path 17b is formed. FIG. 10 is a front view of a principal surface of the cathode-side separator 16a of the fuel cell 1 shown in FIG. 1 as viewed from the side on which the gas flow path 17a is formed. FIG. 11 is a front view of a principal surface of the cathode-side separator 16a of the fuel cell 1 shown in FIG. 1 as viewed from the side on which the cooling water flow path 18 is formed.

Figure 12:
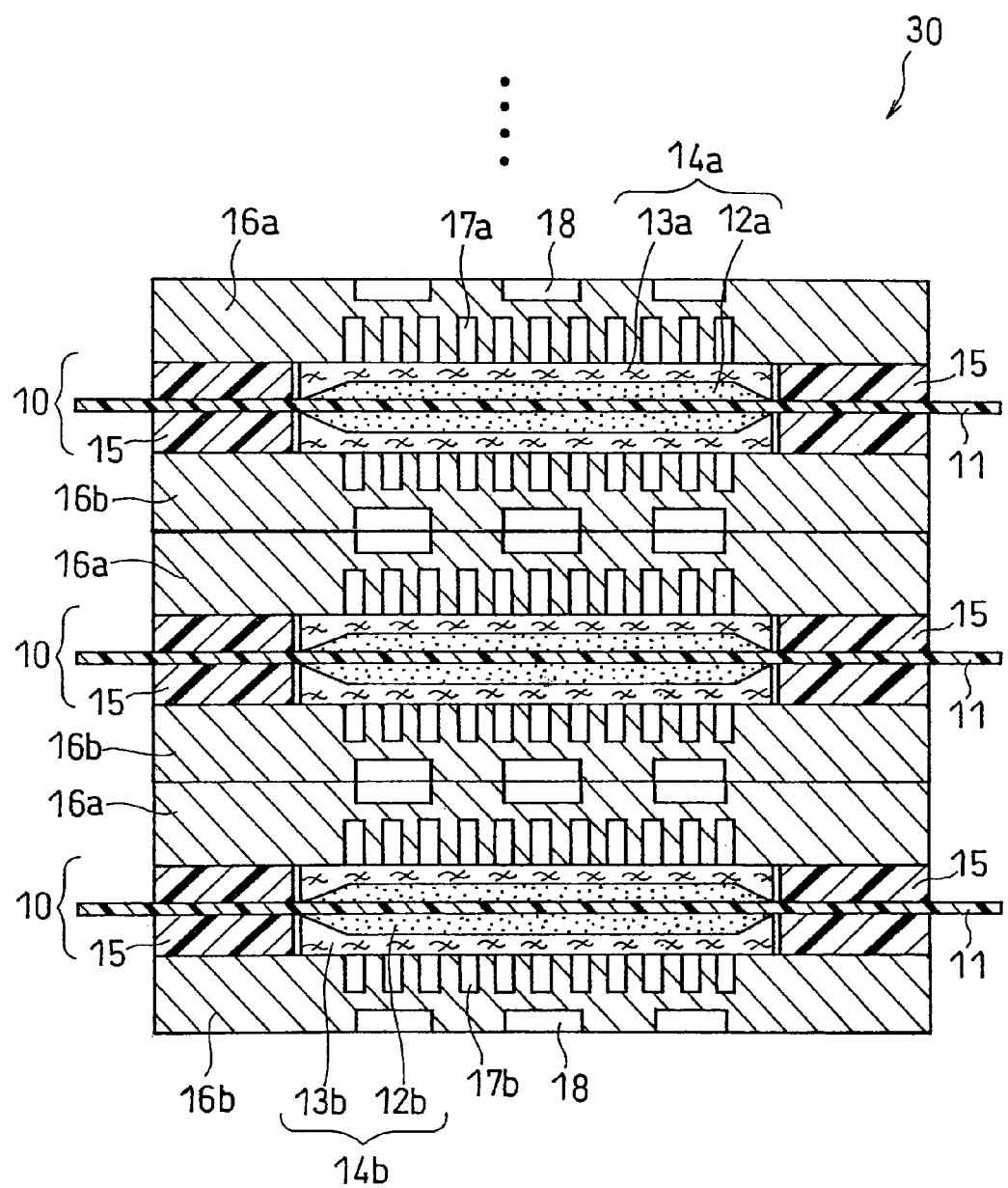
FIG. 12 is a schematic cross-sectional view illustrating a structure of a fuel cell stack according to an embodiment of the present invention, in which a plurality of the fuel cells 1 of an embodiment of the present invention shown in FIG. 1 are stacked.

Because a single fuel cell 1 as shown in FIG. 1 can output a limited voltage value (theoretically speaking, about 1.23 V when hydrogen gas is used as a reducing agent and oxygen is used as an oxidizing agent), the fuel cell 1 is used as a unit cell that constitutes a fuel cell stack 30 shown in FIG. 12 in order to obtain the desired output voltage suitable for the operating environment. Particularly, all the constituent fuel cells 1 are the fuel cells 1 shown in FIG. 1 in the fuel cell stack 30 shown in FIG. 12. FIG. 12 is a schematic cross-sectional view illustrating a structure of a fuel cell stack according to an embodiment of the present invention, in which a plurality of the fuel cells 1 of the present embodiment shown in FIG. 1 are stacked.

As shown in FIG. 12, the fuel cell stack 30 is obtained by stacking a plurality of membrane-electrode assemblies 10 electrically connected in series, with the anode-side separators 16b and the cathode-side separators 16a interposed between the plurality of membrane-electrode assemblies 10. In this case, in order to configure the fuel cell stack 30, it is necessary to provide a manifold for supplying a reaction gas to each membrane-electrode assembly 10 by branching the reaction gas supplied to the fuel cell stack 30 through an external gas line (not shown), a manifold for collectively exhausting a gas exhausted from each membrane-electrode assembly 10 to the outside of the fuel cell stack 30, and a manifold for supplying cooling water to at least one of the anode-side separator 16b and the cathode-side separator 16a by branching cooling water, which is supplied to the fuel cell stack 30 through an external cooling water line (not shown), to the required number.

Accordingly, as shown in FIGS. 8 to 11, the anode-side separator 16b and the cathode-side separator 16a are provided with a fuel gas supply manifold aperture 24, a fuel gas discharge manifold aperture 25, a cooling water supply manifold aperture 26, a cooling water discharge manifold aperture 27, an oxidant gas supply manifold aperture 28, and an oxidant gas discharge manifold aperture 29.

In the anode-side separator 16b of the fuel cell 1, one end of the cooling water flow path 18 is connected to the cooling water supply manifold aperture 26, and the other end is connected to the cooling water discharge manifold aperture 27. Further, in the anode-side separator 16b of fuel cell 1, one end of the gas flow path 17b is connected to the fuel gas supply manifold aperture 24, and the other end is connected to the fuel gas discharge manifold aperture 25. Similarly, in the cathode-side separator 16a of the fuel cell 1, one end of the cooling water flow path 18 is connected to the cooling water supply manifold aperture 26, and the other end is connected to the cooling water discharge manifold aperture 27. Further, in the cathode-side separator 16a of the fuel cell 1, one end of the gas flow path 17a is connected to the oxidant gas supply manifold aperture 28, and the other end is connected to the oxidant gas discharge manifold aperture 29. In other words, the fuel cell 10 of the present embodiment has what is called an "internal manifold type" structure in which manifolds are provided in the separators.

In the anode-side separator 16b shown in FIG. 8, in order to make effective use of the principal surface having a limited size (substantially rectangular principal surface) of the anode-side separator 16b, the cooling water flow path 18 has a serpentine structure. More specifically, the cooling water flow path 18 includes thirteen straight portions 77a (long flow paths) that extend laterally (a direction substantially parallel to the side of the anode-side separator 16b of FIG. 8 on which the fuel gas supply manifold aperture 24 and the oxidant gas supply manifold aperture 28 are formed), and twelve turn portions 77b (short flow paths) for connecting the ends of each adjacent pair of straight portions from the upstream side to the downstream side.

In the anode-side separator 16b shown in FIG. 9, in order to make effective use of the principal surface having a limited size of the anode-side separator 16b, the gas flow path 17b also has a serpentine structure. More specifically, the gas flow path 17b includes eleven straight portions L1 (long flow paths) that extend laterally (a direction substantially parallel to the side of the anode-side separator 16b of FIG. 9 on which the oxidant gas supply manifold aperture 28 and the fuel gas supply manifold aperture 24 are formed), and ten turn portions S1 (short flow paths) for connecting the ends of each adjacent pair of straight portions from the upstream side to the downstream side.

Further, as shown in FIG. 10, the gas flow path 17a of the cathode-side separator 16a also has a serpentine structure. Specifically, the gas flow path 17a includes eleven straight portions L2 (long flow paths) that extend laterally (a direction substantially parallel to the side of the cathode-side separator 16a of FIG. 10 on which the oxidant gas supply manifold aperture 28 and the fuel gas supply manifold aperture 24 are formed), and ten turn portions S2 (short flow paths) for connecting the ends of each adjacent pair of straight portions from the upstream side to the downstream side.

Further, as shown in FIG. 11, the cooling water flow path 18 of the cathode-side separator 16a also has a serpentine structure. Specifically, the cooling water flow path 18 includes thirteen straight portions 77a (long flow paths) that extend laterally (a direction substantially parallel to the side of the cathode-side separator 16a of FIG. 11 on which the fuel gas supply manifold aperture 24 and the oxidant gas supply manifold aperture 28 are formed), and twelve turn portions 77b (short flow paths) for connecting the ends of each adjacent pair of straight portions from the upstream side to the downstream side.

As shown in FIG. 12, in the fuel cell stack 30 of the present embodiment, the fuel gas supply manifold (not shown) is formed by successively aligning a plurality of fuel gas supply manifold apertures 24 of the anode-side separators 16b and the cathode-side separators 16a of the constituent fuel cells 1. In the fuel cell stack 30, the fuel gas discharge manifold aperture (not shown) is formed by successively aligning a plurality of fuel gas discharge manifold apertures 25 of the anode-side separators 16b and the cathode-side separators 16a of the constituent fuel cells 1. Further, in the fuel cell stack 30, another manifolds (not shown) are formed in the same manner as the fuel gas supply manifold described above by successively aligning a plurality of the cooling water supply manifold apertures 26, the cooling water discharge manifold apertures 27, the oxidant gas supply manifold apertures 28 and the oxidant gas discharge manifold apertures 29, respectively.

A method for producing the fuel cell 1 of the present embodiment will be described next.

The cathode catalyst layer 12a and the anode catalyst layer 12b of the present embodiment can be formed using a plurality of catalyst layer forming inks. The dispersion medium used for preparing the catalyst layer forming ink is preferably a liquid containing alcohol and capable of dissolving or dispersing the polymer electrolyte (including a state in which a part of the polymer electrolyte is dissolved and another part is dispersed without being dissolved). The dispersing medium preferably contains at least one of water, methanol, ethanol, propanol, n-butyl alcohol, isobutyl alcohol, sec-butyl alcohol and tert-butyl alcohol. The water and alcohols listed above may be used singly or in combination of two or more. As the alcohol, a straight-chain alcohol having one OH group in its molecule is particularly preferred, namely, ethanol is particularly preferred. Such alcohol includes those having an ether bond, such as ethylene glycol monomethylether.

The composition of the catalyst layer forming ink can be adjusted as appropriate according to the configuration of the cathode catalyst layer 12a or the anode catalyst layer 12b. The solid content is preferably 0.1 to 20 mass %. When the solid content is 0.1 mass % or greater, a catalyst layer having the prescribed thickness can be obtained with the reduced number of times of spraying or application of the catalyst layer forming ink when forming the catalyst layer by spraying or applying the catalyst layer forming ink, and improved productivity is obtained. A solid content of 20 mass % or less is preferred because the resulting liquid mixture will have an appropriate viscosity, and thus a uniform catalyst layer can be obtained. Particularly preferred is a solid content of 1 to 10 mass %.

The catalyst layer forming ink (an ink for forming the cathode catalyst layer 12a and an ink for forming the anode catalyst layer 12b) can be prepared based on a conventional method. Specifically, there is a method involving the use of a stirrer such as a homogenizer or homomixer, a method involving the use of high-speed rotation such as high-speed rotation jet type, and a method in which a dispersion is extruded through a narrow opening with high pressure in a high-pressure emulsifier so as to apply shear force to the dispersion.

When forming the cathode catalyst layer 12a and the anode catalyst layer 12b using the catalyst layer forming ink, the following methods can be used: direct application method in which a catalyst layer is formed directly on a polymer electrolyte membrane 11; and indirect application method in which a catalyst layer is formed indirectly on a polymer electrolyte membrane 11. Examples of the direct application method include screen print method, die coating method, spraying method and inkjet method. An example of the indirect application method is to form a cathode catalyst layer 12a or anode catalyst layer 12b on a substrate made of polypropylene or polyethylene terephthalate, which is then thermally transferred onto a polymer electrolyte membrane 11. To obtain a membrane-electrode assembly 10 according the present embodiment shown in FIG. 6, the cathode catalyst layer 12a and the anode catalyst layer 12b may be first formed on the gas diffusion layers 13, respectively, which are then attached to the polymer electrolyte membrane 11.

As an example of the present embodiment, the thickness of the peripheral area of each catalyst layer may be decreased by reducing the amount of the catalyst layer ink to be applied from the inner side toward the outer side in the peripheral area of the cathode catalyst layer 12a and the anode catalyst layer 12b (the mass of catalyst per unit area of the peripheral area of each catalyst layer may be reduced). In the case of applying the ink by a spraying method, for example, the catalyst layer structure in which the thickness of the peripheral area of each catalyst layer (the mass of catalyst per unit area of the peripheral area of each catalyst layer) decreases from the inner side toward the outer side in the peripheral area of the cathode catalyst layer 12a and the anode catalyst layer 12b can be achieved by changing the number of applications in the plane direction of the cathode catalyst layer 12a and the anode catalyst layer 12b, or changing the amount of the catalyst layer ink to be applied.

In order to define the application area in the cathode catalyst layer 12a and the anode catalyst layer 12b, a mask is disposed on the polymer electrolyte membrane or substrate on which the cathode catalyst layer 12a or the anode catalyst layer 12b is to be formed, such that the mask corresponds to the desired shape of the cathode catalyst layer 12a or the anode catalyst layer 12b. The shape of the cathode catalyst layer 12a and the anode catalyst layer 12b may be defined by punching the mask in advance to have the shape of the cathode catalyst layer 12a or the anode catalyst layer 12b, or by arranging the mask. As the mask, a film-like mask made of polyethylene terephthalate, polypropylene, kapton, metal or the like is usually used in consideration of adhesion with the material to be applied.

Figure 13:
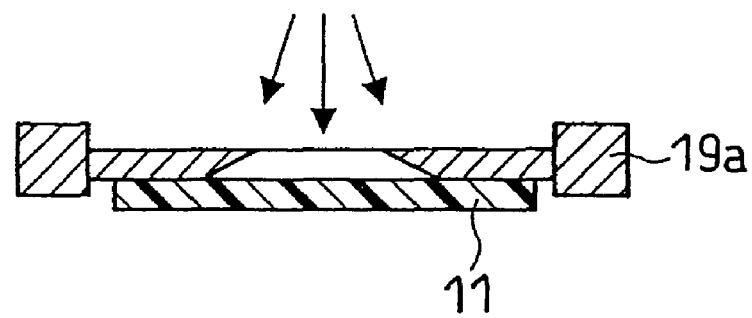
FIG. 13 is a schematic cross-sectional view illustrating a positional relationship between a mask that can be used in an embodiment of the present invention and a polymer electrolyte membrane 11 (or supporting member).

The cathode catalyst layer 12a and the anode catalyst layer 12b of the present embodiment can be formed using, for example, a mask configured as shown in FIG. 13. FIG. 13 is a schematic cross-sectional view illustrating a mask that can be used in the present embodiment, a polymer electrolyte membrane 11 (or supporting member), and their positional relationship. By tightly attaching and fixing a mask 19a having a cross section as shown in FIG. 13 to the polymer electrolyte membrane 11, and applying the catalyst layer forming ink by spraying, the thickness of the peripheral area of each catalyst layer can be decreased from the inner side toward the outer side in the peripheral area of the cathode catalyst layer 12a and the anode catalyst layer 12b (the mass of catalyst per unit area of the peripheral area of each catalyst layer can be decreased from the inner side toward the outer side).

Figure 14:
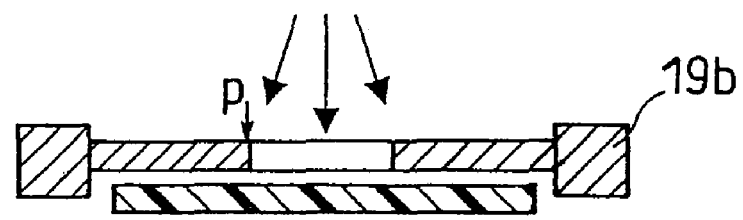
FIG. 14 is a schematic cross-sectional view illustrating a positional relationship between another mask that can be used in an embodiment of the present invention and a polymer electrolyte membrane 11 (or supporting member).

As another example, the cathode catalyst layer 12a and the anode catalyst layer 12b of the present embodiment can be formed also by using a mask configured as shown in FIG. 14. FIG. 14 is a schematic cross-sectional view illustrating a mask that can be used in the present embodiment, a polymer electrolyte membrane 11 (or supporting member), and their positional relationship. By fixing a mask 19b having a cross section as shown in FIG. 14 to the polymer electrolyte membrane 11 with a space formed therebetween without tightly attaching the mask to the polymer electrolyte membrane 11, and applying the catalyst layer forming ink by spraying, the mass of catalyst per unit area of the peripheral area of each catalyst layer can be decreased from the inner side toward the outer side in the peripheral area of the cathode catalyst layer 12a and the anode catalyst layer 12b. Because the catalyst layer forming ink is introduced into the space between the mask 19b and the polymer electrolyte membrane 11, the mass of catalyst per unit area of the peripheral area of each catalyst layer can be decreased from the inner side toward the outer side in peripheral area of the cathode catalyst layer 12a and the anode catalyst layer 12b.

Further, as an example of the present embodiment, the catalyst layer structure in which the mass of catalyst per unit area is decreased can also be achieved by changing the composition of the catalyst layer ink. Specifically, the mass of catalyst can be reduced by reducing the catalyst-carrying rate of the catalyst-carrying carbon that constitutes the catalyst layer ink to be applied from the inner side toward the outer side in the peripheral area of the cathode catalyst layer 12*a* and the anode catalyst layer 12*b*. In this case, as described earlier, the mass of catalyst per unit area of the peripheral area of each catalyst layer can be decreased while the thickness of the peripheral area of each catalyst layer is made substantially constant, rather than decreasing the thickness of the peripheral area of each catalyst layer from the inner side toward the outer side.

Further, according to the present embodiment, a layer structure made of a composition different from that of the material that constitutes the cathode catalyst layer 12*a* and the anode catalyst layer 12*b* may be formed in the thickness direction of the cathode catalyst layer 12*a* and the anode catalyst layer 12*b*. In this case, each layer can be formed by direct application method or indirect application method.

As the thermal transfer method and bonding method, conventional methods can be used. As long as at least one of the anode catalyst layer and the cathode catalyst layer is provided with a decrease portion in which the mass of the electrode catalyst per unit area of the catalyst layer is decreased in the peripheral area of the cathode catalyst layer 12*a* or the anode catalyst layer 12*b* as described earlier, the production method can be changed as appropriate.

As a method other than those mentioned above, the decrease portion in which the mass is decreased from the inner side toward the outer side may be formed by forming the cathode catalyst layer 12*a* or the anode catalyst layer 12*b* having a thickness substantially uniform throughout the layer, and then, for example, dispersing/applying the catalyst layer forming ink in/to the peripheral area of the cathode catalyst layer 12*a* or the anode catalyst layer 12*b* in the form of islands.

Figure 15:
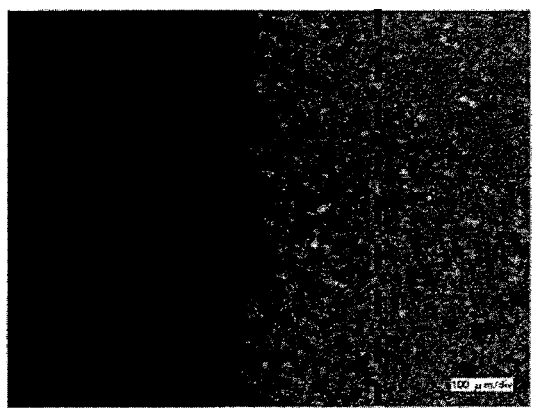
FIG. 15 is an optical micrograph of a catalyst-coated membrane 20 produced in an embodiment (Example 1) of the present invention as viewed from a direction substantially normal to the principal surface of the polymer electrolyte membrane 11, illustrating a portion that includes the peripheral area $12a_1$ of the cathode catalyst layer $12a$.
Figure 15:
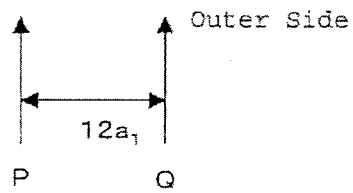
Figure 16:
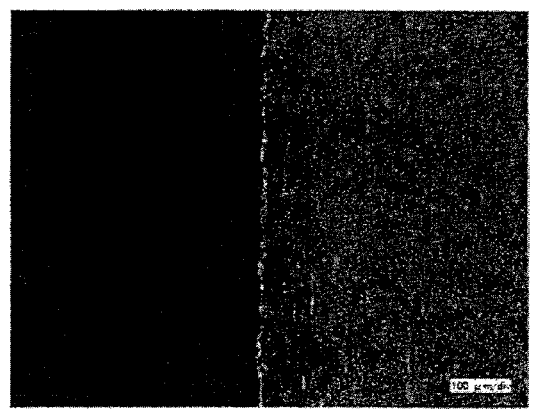
Figure 17:
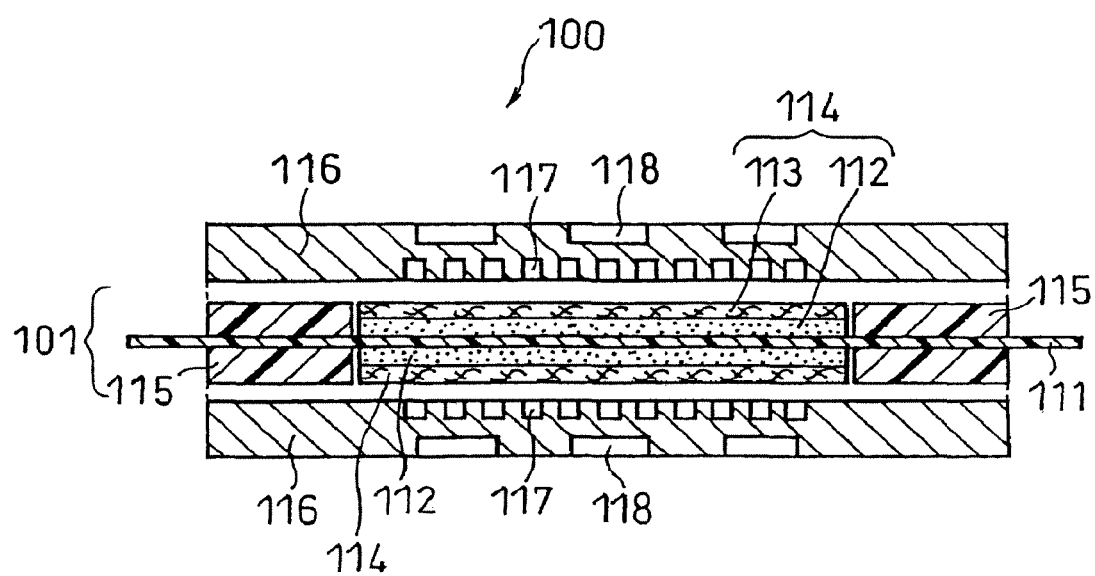
FIG. 17 is a schematic cross-sectional view illustrating an example of the basic structure of a unit cell that can be incorporated in a conventional polymer electrolyte fuel cell.
Figure 18:
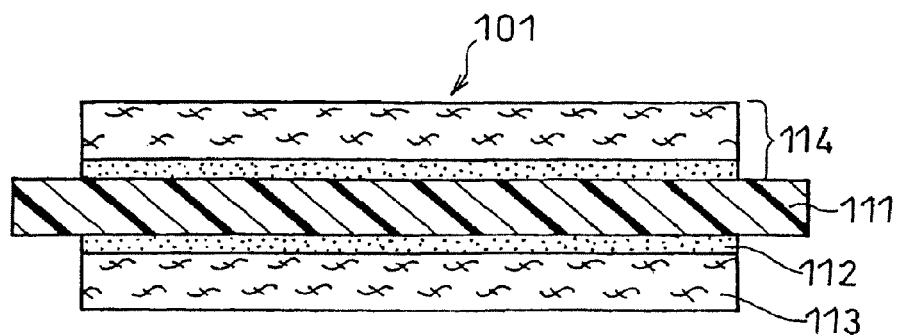
FIG. 18 is a schematic cross-sectional view illustrating an example of the basic structure of a membrane-electrode assembly that can be incorporated in the fuel cell 100 shown in FIG. 17.
Figure 19:
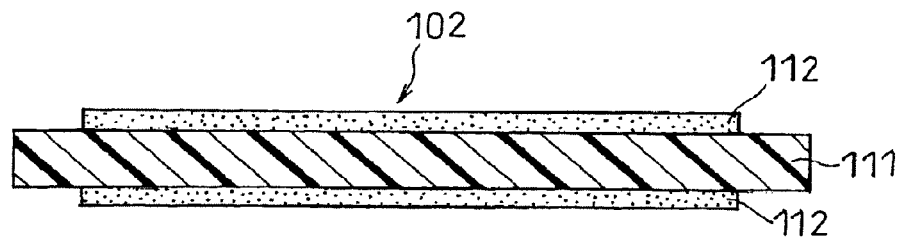
FIG. 19 is a schematic cross-sectional view illustrating an example of a catalyst-coated membrane that constitutes the membrane-electrode assembly 101 shown in FIG. 18.

FIG. 15 is an optical micrograph of a catalyst-coated membrane 20 produced as an example of the present embodiment in Example 1 described below as viewed from a direction substantially normal to the principal surface of the polymer electrolyte membrane 11, illustrating a portion that includes the peripheral area 12$a_1$ of the cathode catalyst layer 12*a*. FIG. 16 is an optical micrograph of a conventional catalyst-coated membrane produced in Comparative Example 1 described below as viewed from a direction substantially normal to the principal surface of the polymer electrolyte membrane 111, illustrating a portion that includes the peripheral area of the cathode catalyst layer 112*a*.

The catalyst-coated membrane 20 of Example 1 described below is formed by applying the catalyst layer forming ink onto the polymer electrolyte membrane 11 by spraying in a state in which the polymer electrolyte membrane 11 and the mask 19*b* shown in FIG. 14 are not tightly attached (i.e., with a space formed therebetween), whereas the catalyst-coated membrane of Comparative Example 1 described below is formed by applying the catalyst layer forming ink onto the polymer electrolyte membrane 111 by spraying in a state in which the polymer electrolyte membrane 111 and the mask 19*b* shown in FIG. 14 are brought into tight contact by thermocompression in advance. The conditions for the application of the catalyst layers such as the catalyst layer ink sprayed and the number of spraying are the same, except for the adhesion of the masks.

As can be seen from FIG. 15, in an example of the present embodiment, the mass of catalyst per unit area decreases from the inner side, that is, from the portion P that indicates the perimeter of the center area of the cathode catalyst layer 12*a* defined by P of the mask 19*b* shown in FIG. 14, toward the outer side in the peripheral area 12$a_1$ of the cathode catalyst layer 12*a* within a distance of about 300 μm. The catalyst is spread also in the outer region that extends beyond the 300 μm. This catalyst layer spread region (decrease portion) is a region located about 700 μm away from the portion P. In other words, the distance S of the decrease portion starting from the portion P is about 700 μm.

It is preferable that the total of the width (plane direction) of the peripheral area 12$a_1$ of the catalyst layer in which the mass of catalyst per unit area is decreased and the width (plane direction) of the spread region is equal to or greater than the thickness of the center area of the cathode-side catalyst layer 12*a*. When the total of the width (plane direction) of the peripheral area 12$a_1$ and the width (plane direction) of the spread region is equal to or greater than the thickness of the center area of the cathode-side catalyst layer 12*a* as described above, the influence of damage that occurs during the production process, such as cracking of the peripheral area of the catalyst layer, is small, and excellent cell characteristics can be exerted.

It is preferable that the outer edge of the center area Z of the cathode-side catalyst layer 12*a* indicated by the portion P is located inwardly (i.e., on the side closer to the center area of the polymer electrolyte membrane 11) from the outer edge of the gas diffusion layer 13*a* located at the position indicated by the portion Q, as shown in FIGS. 2 and 3. When the outer edge of the center area Z of the cathode-side catalyst layer 12*a* is located inwardly from the outer edge of the gas diffusion layer 13*a* as described above, reaction heat that is generated by catalyst reaction can be dissipated through the gas diffusion layer 13*a*, and it is therefore possible to secure cell characteristics with a longer service life.

Although only the peripheral area 12$a_1$ of the cathode-side catalyst layer 12*a* has been described here with reference to FIG. 15, the same applies to another peripheral area 12$a_2$ of the cathode-side catalyst layer 12*a*, and the peripheral areas 12$b_1$ and 12$b_2$ of the anode-side catalyst layer 12*b*.

With the following method, whether or not the abovementioned catalyst layer, which is the primary feature of the present invention, is included in the catalyst-coated membrane 20, the membrane-electrode assembly 10 and the fuel cell 1 can be checked.

By observing a cross section using an electron probe microanalyzer (EPMA), quantification of the atoms of the electrode catalyst, such as platinum, contained in the catalyst layer is possible. Furthermore, the use of a secondary ion mass spectrometer (SIMS), X-ray diffractometer (XRD), optical emission spectrometer (OES), energy dispersive X-ray fluorescence spectrometer (EDX), wavelength dispersive X-ray fluorescence spectrometer (XRF) or the like enables quantitative analysis of the atoms (elements) of the catalyst, and distribution of the catalyst metal per unit area in the plane direction of the catalyst layer can be measured.

While the embodiment of the present invention has been discussed in detail above, it should be understood that the present invention is not limited to the embodiment given above.

For example, in the catalyst-coated membrane 20, the membrane-electrode assembly 10 and the fuel cell 1 of the present invention, it is sufficient that the mass of electrode catalyst per unit area of the catalyst layer is decreased from the inner side toward the outer side in the peripheral area of at least one of the cathode-side catalyst layer and the anode-side catalyst layer. More effectively, it is preferable that both the cathode-side catalyst layer and the anode-side catalyst layer have the catalyst layer structure in which the mass of electrode catalyst is decreased.

The abovementioned preferred embodiment of the present invention has been described in the context of a polymer electrolyte fuel cell configured of a single fuel cell 1, but it should be understood that the present invention is not limited thereto. A polymer electrolyte fuel cell in which a plurality of fuel cells 1 are stacked also falls within the scope of the present invention.

The above embodiment has been described as having a configuration in which the cooling water flow path 18 is provided in both the anode-side separator 16 and the cathode-side separator 16, but it is possible to employ a configuration in which the cooling water flow path 18 is provided in at least one of the separators 16. Particularly when a stack obtained by stacking a plurality of fuel cells 1 is used as a polymer electrolyte fuel cell of the present invention, a cooling water flow path 18 may be provided every two to three fuel cells 1.

Example 1

Hereinafter, the present invention will be described in detail with examples and comparative examples. It should be understood, however, that the present invention is not limited to the examples given below.

Example 1

In this example, a catalyst-coated membrane of the present invention configured as shown in FIG. 3 was produced.

A cathode catalyst layer forming ink was prepared by dispersing a catalyst-carrying carbon (containing 50 mass % of Pt, TEC10E50E available from Tanaka Kikinzoku Kogyo K.K) in which a platinum particle serving as an electrode catalyst is carried on a carbon powder, and a solution of hydrogen ion conductive polymer electrolyte (Flemion available from Asahi Glass Co. Ltd.) in a dispersing medium composed of a mixture of ethanol and water (mass ratio: 1:1).

The polymer electrolyte was added such that the mass of the polymer electrolyte in the applied catalyst layer would be 0.4 times the mass of the catalyst-carrying carbon.

Using the obtained cathode catalyst layer forming ink, a cathode catalyst layer having a monolayer structure was formed such that the total amount of platinum carried would be 0.6 mg/cm$^2$. First, the cathode catalyst layer ink that has been adjusted such that the mass of the polymer electrolyte was 1.0 time was applied onto one surface of a polymer electrolyte membrane (available from Japan Goretex Inc., 150 mm×150 mm) by a spraying method to form a cathode catalyst layer that contains platinum in an amount of 0.12 mg/cm$^2$.

When applying the catalyst layer, a substrate (PET) that has been punched to have an opening having a size of 140 mm×140 mm was used as a mask. This mask was disposed on the polymer electrolyte membrane, to which the ink was to be applied, only during application of the ink by spraying, without being subjected in advance to the step of improving adhesion to the polymer electrolyte membrane by thermocompression or the like, and a weight was disposed about 10 mm outwardly from the punched opening (the portion indicated by p in FIG. 14).

By using the mask in the abovementioned manner, during spraying, the positional relationship between the polymer electrolyte membrane 11 and the mask 19b as shown in FIG. 14 was assumed to be achieved by the pressure of air used for the spraying.

Next, an anode catalyst layer forming ink was prepared by dispersing a catalyst-carrying carbon (containing 50 mass % of Pt—Ru alloy, TEC61E54 available from Tanaka Kikinzoku Kogyo K.K) in which a platinum ruthenium alloy particle (platinum:ruthenium=1:1.5 in molar ratio (mass ratio)) serving as an electrode catalyst is carried on a carbon powder, and a solution of hydrogen ion conductive polymer electrolyte (Flemion available from Asahi Glass Co. Ltd.) in a dispersing medium composed of a mixture of ethanol and water (mass ratio: 1:1).

The obtained anode catalyst layer forming ink was applied onto the other surface of the polymer electrolyte membrane, that is, the surface opposite to that on which the cathode catalyst layer has been formed by a spraying method, and an anode catalyst layer having a monolayer structure and containing platinum in an amount of 0.35 mg/cm$^2$ was formed.

The shape and usage of the mask was the same as those of the mask used when forming the cathode catalyst layer.

Next, using a catalyst-coated membrane of the present invention obtained in the above-described manner, a membrane-electrode assembly having the structure shown in FIG. 2 was produced.

To form a gas diffusion layer, a carbon cloth having a size of 16 cm×20 cm and a thickness of 270 μm (Sk-1 available from Mitsubishi Chemical Corporation) was immersed in a fluorocarbon resin-containing aqueous dispersion (ND-1 available from Daikin Industries, Ltd.), and then dried to impart water repellency to the carbon cloth (water repellent treatment).

Subsequently, a water repellent carbon layer was formed on one side (entire surface) of the water repellent treated carbon cloth. A water repellent carbon layer forming ink was prepared by mixing a conductive carbon powder (DENKA BLACK (trade name) available from Denki Kagaku Kogyo K.K.) with an aqueous solution (D-1 available from Daikin Industries, Ltd.) in which fine powders of polytetrafluoroethylene (PTFE) were dispersed. This water repellent carbon layer forming ink was applied onto one surface of the water repellent treated carbon cloth by a doctor blade method to form a water repellent carbon layer. At this time, part of the water repellent carbon layer was embedded into the carbon cloth.

After that, the water repellent-treated carbon cloth on which the water repellent carbon layer was formed was baked at a temperature not less than the melting point of PTFE, namely, 350° C., for 30 minutes. Finally, the center area of the carbon cloth was cut using a cutting die, and a gas diffusion layer having a size of 142.5 mm×142.5 mm was obtained.

Then, the catalyst-coated membrane was sandwiched by two gas diffusion layers obtained in the abovementioned manner such that the center area of the water repellent carbon layer was in contact with the cathode catalyst layer and the anode catalyst layer, and the whole was thermally compressed by a hot pressing machine (120° C., 30 min, 10 kgf/cm$^2$). Thereby, a membrane-electrode assembly of present invention was obtained.

Finally, a fuel cell 1 (unit cell) of the present invention having the structure shown in FIG. 1 was produced using the membrane-electrode assembly of the present invention obtained in the above-described manner. A unit cell (a fuel cell of the present invention) having an effective electrode (anode or cathode) area of 36 cm$^2$ was produced by sandwiching the membrane-electrode assembly between a separator having a fuel gas supply flow path and a cooling water flow path and a separator having an oxidant gas supply flow path and a cooling water flow path, and disposing a fluorine rubber gasket in the periphery of the cathode and the anode between the two separators.

Example 2

A unit cell (a fuel cell) of the present invention was obtained in the same manner as in Example 1, except that a catalyst layer was formed such that the catalyst mass decrease region (the distance of the decrease portion of the peripheral area of the catalyst layer) satisfies the range shown in Table 1.

Comparative Example 1

A catalyst-coated membrane, a membrane-electrode assembly and a unit cell were produced in the same manner as in Example 1, except that the usage of the mask when spraying the ink to define the shape of the catalyst layer was changed.

A mask was tightly attached to each surface of a polymer electrolyte membrane by thermocompression (90° C., 3 min, 10 kgf/cm$^2$) before spraying the ink. The ink was sprayed through the mask that was tightly attached to the polymer electrolyte membrane, and a cathode catalyst layer and an anode catalyst layer were formed.

[Evaluation Test]
(1) Direct Observation of Peripheral Area of Catalyst-Coated Membrane The membrane-electrode assemblies obtained in Example 1 and Comparative Example 1 were observed using an optical microscope. Specifically, the catalyst mass decrease region per unit area, that is, the distance from the perimeter of the catalyst layer defined by the mask to the perimeter of the actual catalyst layer, was measured. The results are shown in Table 1.

In the optical micrographs of the catalyst-coated membranes obtained in Example 1 and Comparative Example 1 taken from the direction substantially normal to the principal surface of the polymer electrolyte membrane, a portion that included the peripheral area of the cathode catalyst layer was captured (see FIGS. 15 and 16).

(2) Catalyst Mass Decrease Region (Distance of Decrease Portion of Peripheral Area of Catalyst Layer)

The peripheral area of the substantially rectangular cathode catalyst layer and the substantially rectangular anode catalyst layer was divided into sixteen equal parts by dividing four sides of the principal surface of the cathode catalyst layer and four sides of the principal surface of the anode catalyst layer, respectively, as shown in FIG. 4. The distribution of platinum particles in the sixteen unit peripheral areas $Y_1$ to $Y_{16}$ of the cathode and anode catalyst layers was observed by an energy dispersive X-ray fluorescence (EDX). Also, the distance S from the outer edge 17a$_1$ (portion P) of the center area Z of the cathode gas diffusion layer and the anode catalyst layer to the outer edge of the decrease portion was measured using an optical microscope and a scanning electron microscope (SEM), and the maximum value and the minimum value of the distance S were determined.

(3) Durability Evaluation Test

The unit cells obtained in the example and the comparative example were controlled at 70° C., and a hydrogen gas was supplied to the anode-side gas flow path as a fuel gas, and air was supplied to the cathode-side gas flow path. The hydrogen gas and air were humidified so as to have a dew point of about 70° C. while setting a hydrogen gas utilization rate and an air utilization rate to 70% and 40%, respectively before being supplied to the unit cell. Each unit cell was then operated for 12 hours at a current density of 0.3 mA·cm$^{-2}$ for aging (activation treatment).

After aging (activation treatment), each unit cell was subjected to an accelerated durability test, in which the degradation of the membrane-electrode assembly was accelerated so as to obtain its service life in a short time. In the accelerated durability test, each unit cell was operated such that the polymer electrolyte membrane had a relatively low humidity. Specifically, the temperature of the unit cell was increased to 90° C. while supplying a mixed gas of hydrogen and carbon dioxide (volume ratio: 8:2) to the anode-side gas flow path and air to the cathode-side gas flow path. These gases had a dew point of about 70° C. The unit cell was operated at a current density of 0.16 mA·cm$^{-2}$.

The above acceleration test was continued until the unit cell became inoperative due to a decrease in cell voltage. The durability of the unit cell was determined based on the operating time. The results are shown in Table 1.

TABLE 1

| | Catalyst mass decrease region (Decrease portion of peripheral area of catalyst layer) | | Accelerated durability test |
|---|---|---|---|
| | Shortest distance (μm) | Longest distance (μm) | Operating time (hour) |
| Example 1 | 200 | 1200 | 1200 |
| Example 2 | 200 | 800 | 600 |
| Comparative Example 1 | About 0 | About 0 | 300 |

FIG. 15 shows a portion of the optical micrograph of the catalyst-coated membrane produced in Example 1 as viewed from a direction substantially normal to the principal surface of the polymer electrolyte membrane, illustrating the peripheral area of the cathode catalyst layer. FIG. 16 shows a portion of the optical micrograph of the catalyst-coated membrane produced in Comparative Example 1 as viewed from a direction substantially normal to the principal surface of the polymer electrolyte membrane, illustrating the peripheral area of the cathode catalyst layer.

The catalyst-coated membrane 20 of Example 1 was produced by applying the catalyst layer forming ink onto the polymer electrolyte membrane 11 by spraying in a state in which the polymer electrolyte membrane 11 and the mask 19b shown in FIG. 14 were not tightly attached (i.e., with a space formed therebetween), whereas the catalyst-coated membrane of Comparative Example 1 was produced by applying the catalyst layer forming ink onto the polymer electrolyte membrane 111 by spraying in a state in which the polymer electrolyte membrane 111 and the mask 19b shown in FIG. 14 were tightly attached in advance by thermocompression. The conditions for the application of the catalyst layers were the same such as the catalyst layer ink sprayed and the number of spraying, except for the adhesion of the masks.

As shown in FIG. 15, in the catalyst-coated membrane of Example 1, it was observed that the mass of catalyst per unit area decreased from the inner side, that is, from the portion of the line P that indicates the perimeter of the center area of the cathode catalyst layer 12a defined by the portion indicated by p of the mask 19b shown in FIG. 14, toward the outer side in the peripheral area 12a$_1$ of the cathode catalyst layer 12a within a distance of about 300 μm. The catalyst was spread also in the region that extended beyond the 300 μm. This catalyst layer spread region was a region located about 700 μm away from the line P. The same observation was obtained for the peripheral areas 12b$_1$ and 12b$_2$ of the anode-side catalyst layer 12b. As for the catalyst-coated membrane of Comparative Example 1, it was observed that the catalyst layer spread region as described above was not formed.

As can be seen from the results of Table 1, the membrane-electrode assembly of Example 1 was found to achieve better durability and cell characteristics with a longer service life than the membrane-electrode assembly of Comparative Example 1.

INDUSTRIAL APPLICABILITY

The polymer electrolyte fuel cell of the present invention is expected to be useful for mobile units such as automobiles, distributed power generation systems, home cogeneration systems, and so on.

The invention claimed is:

1. A fuel cell comprising:
a catalyst-coated membrane including an anode catalyst layer, a cathode catalyst layer, a polymer electrolyte membrane disposed between said anode catalyst layer and said cathode catalyst layer;
an anode gas diffusion layer;
a cathode gas diffusion layer;
an anode separator; and
a cathode separator,
wherein said anode catalyst layer and said cathode catalyst layer comprise a hydrogen ion conductive polymer electrolyte and a catalyst-carrying carbon that includes a carbon powder and an electrode catalyst carried on said carbon powder,
said anode gas diffusion layer is disposed outside said anode catalyst layer, and said cathode gas diffusion layer is disposed outside said cathode catalyst layer,
said anode separator is disposed outside said anode gas diffusion layer, and said cathode separator is disposed outside said cathode gas diffusion layer,
said anode separator has a gas flow path for supplying a fuel gas to said anode gas diffusion layer and said anode catalyst layer,
said cathode separator has a gas flow path for supplying an oxidant gas to said cathode gas diffusion layer and said cathode catalyst layer,
at least one of said anode catalyst layer and said cathode catalyst layer has a center area facing either said gas flow path for supplying the fuel gas or said gas flow path for supplying the oxidant gas, respectively, and a peripheral area around said center area,
a thickness of said center area and a mass of said electrode catalyst per unit area of said center area are constant, and
said peripheral area in the form of islands, and a thickness of said peripheral area and a mass of said electrode catalyst per unit area of said peripheral area decrease from an inner side toward an outer side.

2. The fuel cell in accordance with claim 1, wherein at least one of said anode catalyst layer and said cathode catalyst layer is formed by applying a catalyst layer forming ink onto a surface of the polymer electrolyte membrane or a supporting member by spraying, and has a monolayer structure.

3. The fuel cell in accordance with claim 2, wherein said catalyst layer forming ink is applied by using a catalyst layer forming mask with a space formed between said catalyst layer forming mask and said polymer electrolyte membrane or said supporting member.

4. The fuel cell in accordance with claim 1, wherein in a cross section substantially parallel to a direction normal to a principal surface of said membrane-electrode assembly, said peripheral area is disposed outwardly from an outer edge of an outermost part of the gas flow path formed in at least one of said anode separator and said cathode separator.

* * * * *